(12) United States Patent
Malik et al.

(10) Patent No.: US 10,397,976 B2
(45) Date of Patent: Aug. 27, 2019

(54) NETWORK ARCHITECTURE FOR MULTI-BAND OPERATION

(71) Applicant: QUALCOMM Incorporated, San Diego, CA (US)

(72) Inventors: Rahul Malik, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/022,522

(22) Filed: Jun. 28, 2018

(65) Prior Publication Data

US 2019/0069336 A1    Feb. 28, 2019

Related U.S. Application Data

(60) Provisional application No. 62/550,498, filed on Aug. 25, 2017.

(51) Int. Cl.
*H04W 16/32* (2009.01)
*H04W 76/27* (2018.01)
(Continued)

(52) U.S. Cl.
CPC ............ *H04W 76/27* (2018.02); *H01Q 5/307* (2015.01); *H04B 1/005* (2013.01); *H04B 1/406* (2013.01);
(Continued)

(58) Field of Classification Search
CPC ........... H04J 11/0086; H04W 72/0453; H04W 16/32; H04W 72/08; H04W 76/025; H04W 76/15; H04W 92/20; H04W 16/10; H04W 72/04; H04W 24/02; H04W 16/16; H04W 84/045; H04W 4/02; H04W 84/042; H04W 88/08; H04L 5/0035; H04L 5/0055; H04L 5/0057; H04L 12/2869; H04L 12/5695;
(Continued)

(56) References Cited

U.S. PATENT DOCUMENTS

2011/0034177 A1    2/2011  Oh et al.
2013/0235746 A1    9/2013  Patel et al.

OTHER PUBLICATIONS

Partial International Search Report—PCT/US2018/040352—ISA/EPO—dated Sep. 24, 2018.
(Continued)

*Primary Examiner* — Jung Liu
(74) *Attorney, Agent, or Firm* — Hollan & Hart LLP

(57) ABSTRACT

Methods, systems, and devices for wireless communication are described. Some wireless communications systems may support multi-band operation. Different frequency bands may experience different communication characteristics (e.g., frequency-dependent fading), which may result in undesirable interference patterns and/or coverage gaps. The described techniques provide for a network architecture that optimizes throughput while considering interference metrics. The network architecture may in some cases adapt to changes in the communication environment (e.g., dynamically or semi-statically), and the adaptation may be autonomous or may be performed in conjunction with a coordinating entity. Additionally, the described techniques provide for improved mobility procedures for devices within the network, which may improve throughput, reduce latency, or otherwise benefit the wireless communications system.

30 Claims, 10 Drawing Sheets

(51) Int. Cl.
*H01Q 5/307* (2015.01)
*H04L 5/00* (2006.01)
*H04W 24/10* (2009.01)
*H04B 1/00* (2006.01)
*H04B 1/403* (2015.01)
*H04W 16/10* (2009.01)
*H04W 24/02* (2009.01)
*H04W 24/08* (2009.01)

(52) U.S. Cl.
CPC ........... *H04L 5/0053* (2013.01); *H04W 16/10* (2013.01); *H04W 24/02* (2013.01); *H04W 24/10* (2013.01); *H04L 5/0007* (2013.01); *H04W 24/08* (2013.01)

(58) Field of Classification Search
CPC ......... H04L 47/00; H04L 47/70; H04L 47/78; H04L 47/821; H04L 47/827
See application file for complete search history.

(56) References Cited

OTHER PUBLICATIONS

International Search Report and Written Opinion—PCT/US2018/040352—ISA/EPO—dated Nov. 16, 2018.

NETWORK ARCHITECTURE FOR MULTI-BAND OPERATION

CROSS REFERENCES

The present Application for Patent claims the benefit of U.S. Provisional Patent Application No. 62/550,498 by MALIK, et al., entitled "NETWORK ARCHITECTURE FOR MULTI-BAND OPERATION," filed Aug. 25, 2017, assigned to the assignee hereof, and expressly incorporated by reference herein.

BACKGROUND

The following relates generally to wireless communication, and more specifically to network architecture for multi-band operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In wireless communications systems supporting communications over multiple frequency bands, higher frequencies may generally experience larger degrees of signal attenuation. For example, millimeter wave (mmW) communications may experience substantially lower coverage in non-line-of-sight (NLOS) channels (e.g., compared to sub-7 GHz communications). Additionally, mmW deployments may provide sparser coverage (e.g., larger or more regular coverage gaps) than low-band deployments. In some cases, unlicensed mmW communications may be associated with stricter effective isotropic radiated power (EIRP) regulations than licensed or shared spectrum communications. For example, the 60 GHz unlicensed band may limit transmission power to 40 dBm per device while the 37 GHz shared band may allow transmission powers up to 75 dBm per 100 MHz per device. Additionally or alternatively, maximum permissible exposure (MPE) restrictions may limit the achievable data rate and/or communication coverage at certain high-band (e.g., mmW) frequencies (e.g., for both unlicensed and licensed channels).

Power consumption in mmW devices may be dominated by the radio frequency (RF) components, which may dissipate power due to lower efficiencies associated with operation at higher frequencies. Additionally, stand-alone cellular design approaches may be ineffective for mmW deployments (e.g., due to the low achievable inter-site distances (ISDs) which may create signal interference for communications over frequencies that experience lower degrees of signal attenuation). Therefore, while communications over higher frequency bands may experience benefits (e.g., greater bandwidth), such benefits may in some cases be offset by the resource cost. Improved techniques that support multi-band operation may be desired.

SUMMARY

The described techniques relate to improved methods, systems, devices, or apparatuses that support network architecture for multi-band operation. Generally, the described techniques provide for a dynamic network infrastructure that supports operation over multiple frequency bands. For example, the network may be an example of a self-organizing network (SON) which is able to react (e.g., dynamically, semi-statically, etc.) to changes in a communication environment. The network may generally support self-organization of devices into communication clusters. For example, some or all of the devices may be examples of dual-band capable devices (e.g., may have multiple radios, each radio supporting communication over a respective frequency band). Each cluster may have a single anchor device that provides low-band (e.g., sub-7 GHz) communication support for a relatively large coverage area and one or more high-band (e.g., mmW band) devices that support communications within respective portions of the large coverage area.

A method of wireless communication providing a wireless communications service for a plurality of UEs in a service area is described. The method may include providing a plurality of base stations within the service area, each base station of the plurality of base stations comprising a first radio associated with a first antenna array supporting communication over a first frequency band and a second radio associated with a second antenna array supporting communication over a second frequency band, the first frequency band associated with a first path loss and the second frequency band associated with a second path loss greater than the first path loss, determining a signal metric pattern for respective signals transmitted by the plurality of base stations over the first frequency band, configuring, based at least in part on the signal metric pattern, a first group of base stations of the plurality of base stations to operate over the first frequency band and the second frequency band for the wireless communications service, configuring, based at least in part on the signal metric pattern, a second group of base stations of the plurality of base stations to operate only over the second frequency band for the wireless communications service, wherein each base station in the second group of base stations is associated with a respective one of the base stations in the first group of base stations for the wireless communications service.

An apparatus for wireless communication is described. The apparatus may include means for providing a plurality of base stations within the service area, each base station of the plurality of base stations comprising a first radio associated with a first antenna array supporting communication over a first frequency band and a second radio associated with a second antenna array supporting communication over a second frequency band, the first frequency band associated with a first path loss and the second frequency band associated with a second path loss greater than the first path loss, means for determining a signal metric pattern for respective signals transmitted by the plurality of base stations over the first frequency band, means for configuring, based at least in part on the signal metric pattern, a first group of base stations of the plurality of base stations to operate over the first frequency band and the second frequency band for the wireless communications service, means for configuring, based at least in part on the signal metric pattern, a second group of base stations of the plurality of base stations to operate only over the second frequency band for the wireless communications service, wherein each base station in the second group of base stations is associated with a respective one of the base stations in the first group of base stations for the wireless communications service.

Another apparatus for wireless communication is described. The apparatus may include a processor, memory in electronic communication with the processor, and instructions stored in the memory. The instructions may be operable to cause the processor to provide a plurality of base stations within the service area, each base station of the plurality of base stations comprising a first radio associated with a first antenna array supporting communication over a first frequency band and a second radio associated with a second antenna array supporting communication over a second frequency band, the first frequency band associated with a first path loss and the second frequency band associated with a second path loss greater than the first path loss, determine a signal metric pattern for respective signals transmitted by the plurality of base stations over the first frequency band, configure, based at least in part on the signal metric pattern, a first group of base stations of the plurality of base stations to operate over the first frequency band and the second frequency band for the wireless communications service, configure, based at least in part on the signal metric pattern, a second group of base stations of the plurality of base stations to operate only over the second frequency band for the wireless communications service, wherein each base station in the second group of base stations is associated with a respective one of the base stations in the first group of base stations for the wireless communications service.

A non-transitory computer readable medium for wireless communication is described. The non-transitory computer-readable medium may include instructions operable to cause a processor to provide a plurality of base stations within the service area, each base station of the plurality of base stations comprising a first radio associated with a first antenna array supporting communication over a first frequency band and a second radio associated with a second antenna array supporting communication over a second frequency band, the first frequency band associated with a first path loss and the second frequency band associated with a second path loss greater than the first path loss, determine a signal metric pattern for respective signals transmitted by the plurality of base stations over the first frequency band, configure, based at least in part on the signal metric pattern, a first group of base stations of the plurality of base stations to operate over the first frequency band and the second frequency band for the wireless communications service, configure, based at least in part on the signal metric pattern, a second group of base stations of the plurality of base stations to operate only over the second frequency band for the wireless communications service, wherein each base station in the second group of base stations is associated with a respective one of the base stations in the first group of base stations for the wireless communications service.

In some examples of the method, apparatus, and non-transitory computer-readable medium described above, the signal metric pattern may be based on a spatial coverage metric, a first band utilization metric associated with the first band, or a combination thereof.

In some examples of the method, apparatus, and non-transitory computer-readable medium described above, determining the signal metric pattern comprises: determining one or more configurations of the plurality of base stations for the first group of base stations and the second group of base stations, wherein the spatial coverage metric for each of the one or more configurations satisfies a spatial coverage requirement. Some examples of the method, apparatus, and non-transitory computer-readable medium described above may further include processes, features, means, or instructions for selecting a configuration from the one or more configurations based at least in part on the first band utilization metrics of the one or more configurations.

Some examples of the method, apparatus, and non-transitory computer-readable medium described above may further include processes, features, means, or instructions for determining, for at least a subset of the plurality of base stations, signal strength metrics for signals transmitted by other base stations of the plurality of base stations, wherein the spatial coverage metric may be computed based at least in part on the signal strength metrics.

Some examples of the method, apparatus, and non-transitory computer-readable medium described above may further include processes, features, means, or instructions for determining, for a subset of the plurality of base stations, signal interference metrics associated with interference between signals transmitted by other base stations of the plurality of base stations, wherein the first band utilization metric may be computed based at least in part on the signal interference metrics.

Some examples of the method, apparatus, and non-transitory computer-readable medium described above may further include processes, features, means, or instructions for providing at least one additional base station within the service area, the at least one additional base station and the plurality of base stations comprising a second plurality of base stations, wherein each of the at least one additional base stations comprises a first radio associated with a first antenna array supporting communication over the first frequency band and a second radio associated with a second antenna array supporting communication over the second frequency band. Some examples of the method, apparatus, and non-transitory computer-readable medium described above may further include processes, features, means, or instructions for determining a second signal metric pattern for second respective signals transmitted by the second plurality of base stations over the first frequency band. Some examples of the method, apparatus, and non-transitory computer-readable medium described above may further include processes, features, means, or instructions for configuring, based at least in part on the second signal metric pattern, a third group of base stations of the second plurality of base stations to operate over the first frequency band and the second frequency band for the wireless communications service. Some examples of the method, apparatus, and non-transitory computer-readable medium described above may further include processes, features, means, or instructions for configuring, based at least in part on the second signal metric pattern, a fourth group of base stations of the second plurality of base stations to operate only over the second frequency band for the wireless communications service. Some examples of the method, apparatus, and non-transitory computer-readable medium described above may further include processes, features, means, or instructions for associating each base station in the fourth group of base stations with a respective one of the base stations in the third group of base stations for the wireless communications service.

Some examples of the method, apparatus, and non-transitory computer-readable medium described above may further include processes, features, means, or instructions for provisioning a first subset of the second group of base stations with a first common radio resource control (RRC) configuration, wherein the first subset of the second group of base stations may be associated with a first base station in the first group of base stations. Some examples of the method, apparatus, and non-transitory computer-readable medium described above may further include processes, features, means, or instructions for providing the wireless communications service to a first subset of the plurality of UEs based at least in part on the provisioning.

In some examples of the method, apparatus, and non-transitory computer-readable medium described above, providing the wireless communications service to the first subset of the plurality of UEs comprises: transmitting, to at least one UE of the first subset of the plurality of UEs, downlink data over the second frequency band from a serving base station of the first subset of the second group of base stations. Some examples of the method, apparatus, and non-transitory computer-readable medium described above may further include processes, features, means, or instructions for receiving, at the first base station in the first group of base stations, uplink control information transmitted from the at least one UE over the first frequency band, the uplink control information based at least in part on the downlink data.

Some examples of the method, apparatus, and non-transitory computer-readable medium described above may further include processes, features, means, or instructions for detecting a mobility event of a UE of the first subset of the plurality of UEs based at least in part on a received signal strength corresponding to a reference signal transmitted on the first frequency band or the second frequency band. Some examples of the method, apparatus, and non-transitory computer-readable medium described above may further include processes, features, means, or instructions for commissioning a second base station of the first subset of the second group of base stations for the UE based at least in part on the detected mobility event. Some examples of the method, apparatus, and non-transitory computer-readable medium described above may further include processes, features, means, or instructions for transmitting, to the UE, second downlink data over the second frequency band from the second base station of the first subset of the second group of base stations. Some examples of the method, apparatus, and non-transitory computer-readable medium described above may further include processes, features, means, or instructions for receiving, at the first base station in the first group of base stations, second uplink control information transmitted from the UE over the first frequency band, the second uplink control information based at least in part on the second downlink data.

Some examples of the method, apparatus, and non-transitory computer-readable medium described above may further include processes, features, means, or instructions for provisioning a second subset of the second group of base stations with a second common RRC configuration different from the first common RRC configuration, wherein the second subset of the second group of base stations may be associated with a second base station in the first group of base stations, and wherein the first subset and second subsets of the second group of base stations comprise disjoint subsets. Some examples of the method, apparatus, and non-transitory computer-readable medium described above may further include processes, features, means, or instructions for providing the wireless communications service to a second subset of the plurality of UEs based at least in part on the provisioning.

Some examples of the method, apparatus, and non-transitory computer-readable medium described above may further include processes, features, means, or instructions for detecting a mobility event of a UE of the first subset of the plurality of UEs based at least in part on a received signal strength corresponding to a reference signal transmitted on the first frequency band or the second frequency band. Some examples of the method, apparatus, and non-transitory computer-readable medium described above may further include processes, features, means, or instructions for performing a handover from the first base station in the first group of base stations to the second base station in the first group of base stations based at least in part on the detected mobility event. Some examples of the method, apparatus, and non-transitory computer-readable medium described above may further include processes, features, means, or instructions for transmitting, to the UE, downlink data over the second frequency band from a serving base station of the second subset of the second group of base stations. Some examples of the method, apparatus, and non-transitory computer-readable medium described above may further include processes, features, means, or instructions for receiving, at the second base station in the first group of base stations, uplink control information transmitted from the UE over the first frequency band, the uplink control information based at least in part on the downlink data.

DETAILED DESCRIPTION

Many wireless systems support communication over multiple frequency bands. Different frequency bands may exhibit different communication characteristics. For example, transmissions on higher frequencies may generally experience larger degrees of frequency-dependent fading. Such frequency-dependent characteristics may lead to communications over the higher frequency bands experiencing a higher path loss (e.g., and therefore a smaller coverage range) than otherwise similar communications over the lower frequency bands. Such limitations may in some cases be ameliorated through the use of beamforming techniques, whereby signals are transmitted such that they constructively interfere at a receiving device. However, beamforming may be resource intensive (e.g., such that it may drain energy from power-limited devices, may generate signaling overhead that reduces system throughput, etc.). Accordingly, the described techniques provide for a framework of operation whereby mmW communications may be anchored to communications over a lower frequency band.

Various improvements are considered and described below. For example, a network architecture is described in which devices support both low-band and mmW communications. Example low-band radio access technologies (RATs) include Long Term Evolution (LTE) and New Radio (NR). The low-band radio for a given device may operate in the licensed and/or the unlicensed/shared spectra (e.g., as described further below). Similarly, the mmW radio for the device may operate in a licensed (e.g., 37 GHz) or unlicensed (e.g., 60 GHz) spectrum. Improved data rates (e.g., and communication reach) at lower transmission powers (e.g., in NLOS environments) may be supported (e.g., by using the low-band for uplink transmissions). Additional power-save opportunities (e.g., for a UE) may be provided by leveraging the low-band channel for discovery, channel access, downlink control information, etc. Further benefits may in some cases be realized through the support of high uplink data rates for the UE over mmW channels for low-latency/high throughput use cases (e.g., virtual reality).

Aspects of the disclosure are initially described in the context of a wireless communications system. Aspects of the disclosure are then described in the context of example network configurations and process flows. Aspects of the disclosure are further illustrated by and described with reference to apparatus diagrams, system diagrams, and flowcharts that relate to network architecture for multi-band operation.

Figure 1:
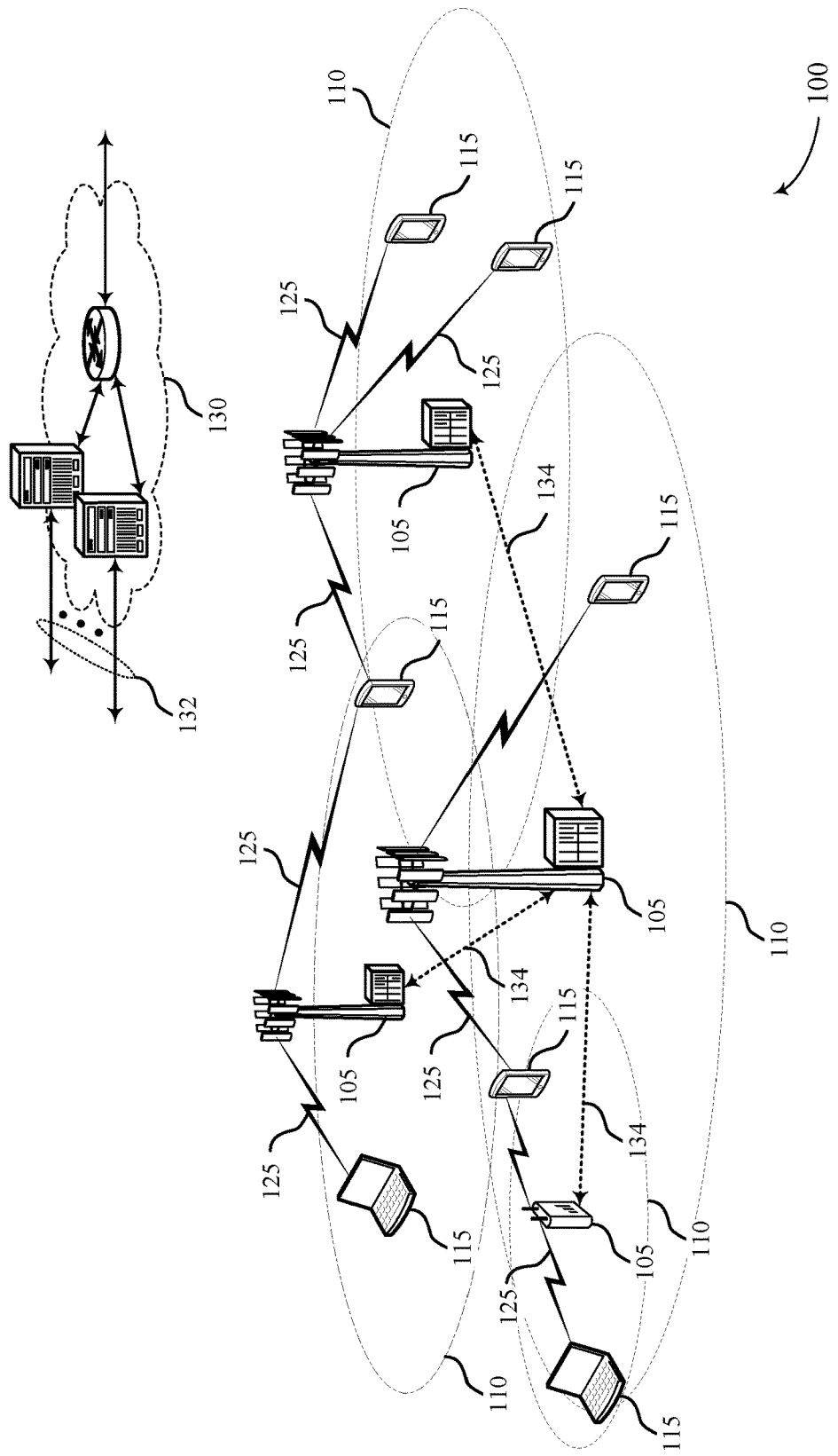
FIG. 1 illustrates an example of a system for wireless communication that supports network architecture for multi-band operation in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE network, an LTE-Advanced (LTE-A) network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

A base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID) or a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, an augmented reality/virtual reality (AR/VR) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction may be determined based at least in in part on signals transmitted in different beam directions. For example, a UE 115 may receive one or more reference signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "receive beamforming" according to different receive beams or receive directions. In some examples a receiving device may use a single receive beam to receive along a single beam direction (e.g., when receiving a data signal). The single receive beam may be aligned in a beam direction determined based at least in part on receive beamforming according to different receive beam directions (e.g., a beam direction determined to have a highest signal strength, highest signal-to-noise ratio, or otherwise acceptable signal quality based at least in part on receive beamforming according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
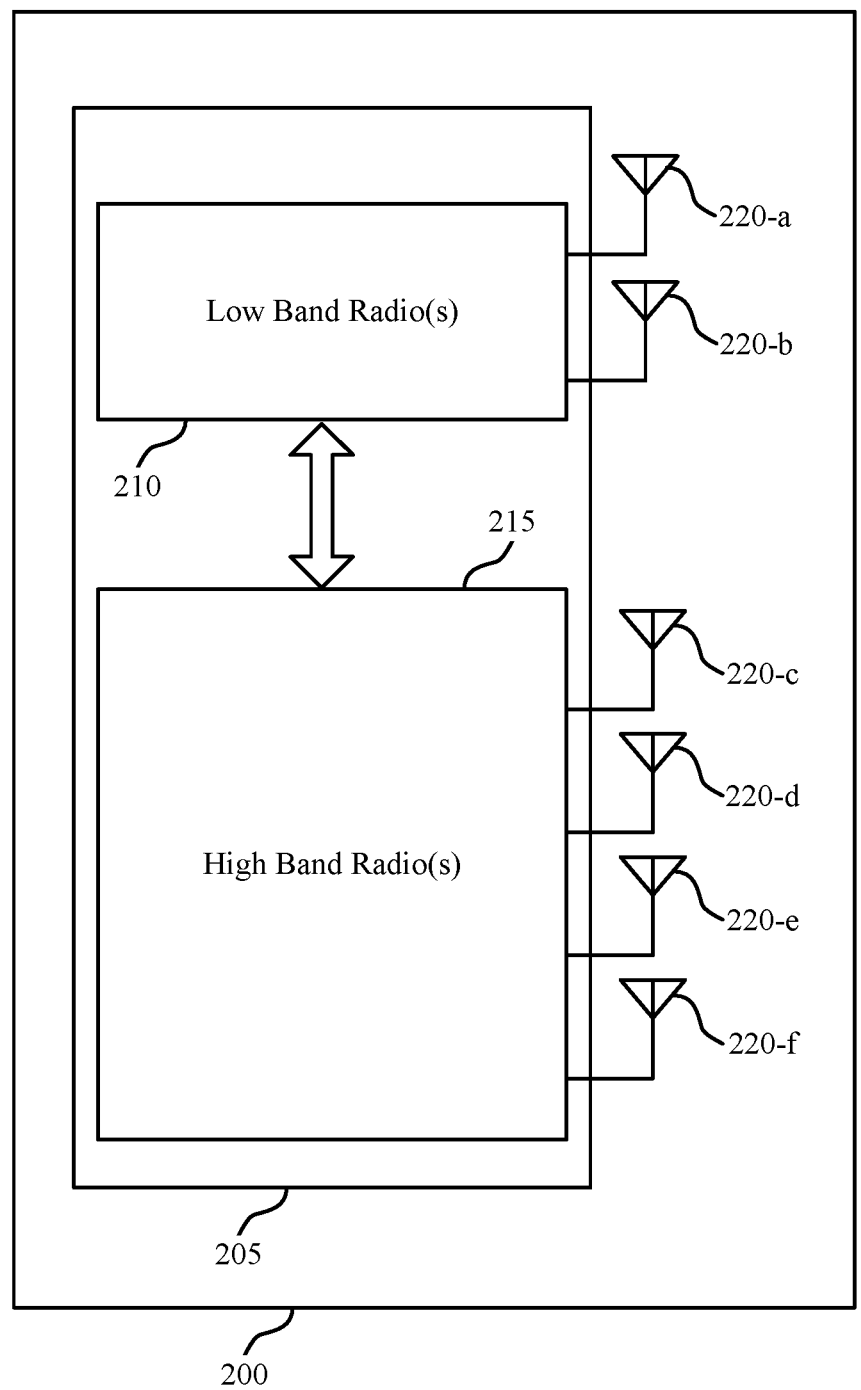
FIG. 2 illustrates an example of a device that supports network architecture for multi-band operation in accordance with aspects of the present disclosure.

FIG. 2 illustrates an example of a wireless device 200 that supports network architecture for multi-band operation in accordance with various aspects of the present disclosure. In some examples, wireless device 200 may implement aspects of wireless communication system 100. For example, wireless device 200 may be an example of a base station 105 or a UE 115 as described with reference to FIG. 1. In some cases, wireless device 200 may be an example of a network entity (e.g., a coordinating entity).

Wireless device 200 includes one or more low-band radios 210 and one or more high-band radios 215, which may be components of a wireless communications manager 205 (e.g., which may be an example of or implement aspects of communications manager 715 described with reference to FIG. 7). For example, a given low-band radio 210 may support sub 7 GHz communications while a given high-band radio 215 may support communications in a higher frequency band such as above 7 GHz or between 30 GHz and 300 GHz (e.g., mmW communications). Various techniques for providing internal synchronization between the low-band radio(s) 210 and the high-band radio(s) 215 are considered. As discussed above, high-band radio 215 may communicate over smaller path distances (e.g., especially in no line of sight or NLOS environments) than low-band radio 210. However, spectrum resources may be more plentiful at frequencies used by high-band radio 215. In addition, using a higher density pattern of base stations 105 for communication over higher frequencies such as mmW increases frequency reuse and thus increases capacity. Because of such coverage differences, a high density arrangement of base stations 105 suited for mmW communication may not be suited for efficient use of the low-band frequency resources. That is, because of the lower degrees of signal attenuation associated with low-band communications and small ISDs (e.g., to reduce coverage gaps for high-band communications), some wireless devices 200 may communicate using only high-band radio(s) 215. For example, the low-band radio 210 may be used to initially establish a connection, and then communications may be transitioned to high-band radio 215 once the high-band communication link is established. Alternatively, the low-band radio may continue to be used for data and control communications, or only control communications (RRC configuration, uplink control information, etc.). Such deployments may reduce interference over the low-band or otherwise benefit a wireless communications system. As described with reference to FIG. 3, a given transmission deployment (e.g., in which certain wireless devices 200 suspend communications over a low-band radio 210) may be a result of a configuration (e.g., during deployment) or may be a result of SON functionality.

In accordance with the described techniques, a wireless device 200 may use the low-band radio 210 (e.g., which may be associated with wider coverage) for synchronizing timing with other neighboring wireless devices 200 (e.g., may transmit discovery reference signals (DRSs) on the low-band). In some cases, each radio may be associated with one or more antennas 220. For example, an antenna 220 may refer to a given collection of antenna elements in an antenna array. In this example, low-band radio 210 supports communications over antennas 220-a, 220-b (e.g., which may be located in a first antenna array associated with a first antenna spacing) while high-band radio 215 supports communications over antennas 220-c, 220-d, 220-e, 220-f (e.g., which may be associated with a second antenna spacing). In some examples, high-band radio(s) 215 may be associated with multiple antenna panels (e.g., which each may include multiple antennas and corresponding phase control circuits). As described further below, some wireless devices 200 may support multiple carriers over low-band radio 210 and/or high-band radio 215 (e.g., to allow for carrier aggregation and/or dual connectivity).

Wireless communications manager 205 and/or at least some of its various sub-components may be implemented in hardware, software executed by a processor, firmware, or any combination thereof. If implemented in software executed by a processor, the functions of the wireless communications manager 205 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The wireless communications manager 205 and/or at least some of its various sub-components may be physically located at various positions, including being distributed such that portions of functions are implemented at different physical locations by one or more physical devices. In some examples, wireless communications manager 205 and/or at least some of its various sub-components may be a separate and distinct component in accordance with various aspects of the present disclosure. In other examples, wireless communications manager 205 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

According to various aspects, a network of wireless devices 200 (e.g., implemented in base stations 105) may be adaptively optimized for multi-band communication coverage of a service area. In some aspects, the adaptive optimization is performed using communications in a first, low frequency band (e.g., a sub-7 GHz band) for multiple base stations 105 each implementing a low-band radio 210 and a high-band radio 215. For example, an optimization process may begin with each base station 105 of a set of base stations 105 within a service area transmitting pilot or reference signals (e.g., DRS signals, etc.) over channels of the low frequency band, and a signal metric pattern may be determined based on the low-band reference signals. Additionally, the signal metric pattern may be determined by the received signal strengths of discovery reference signals or signals from a base station, user equipment (UE), or both.

In one example, the signal metric pattern may be a distribution summary of different components and signal metrics of the network. Further, the distribution or pattern may vary as the different metrics vary. This pattern may be a distribution summary of, among other things, the configuration of first and second groups of base stations, the spatial coverage metric, the first band utilization metric, the strength of received low-band and high-band reference signals in which the distribution of the base station and UE reception strength is mapped, discovery reference signals (DRS signals), and so forth.

The network (e.g., one or more wireless communication managers 205 in the base stations 105) may configure, based on the signal metric pattern, a first group of base stations of the set of base stations to operate over the first frequency band and the second frequency band for the wireless communications service. The network may configure, based on the signal metric pattern, a second group of base stations of the set of base stations to operate only over the second frequency band for the wireless communications service. Wireless communications manager 205 may associate each base station in the second group of base stations with a respective one of the base stations in the first group of base stations for the wireless communications service.

Figure 3:
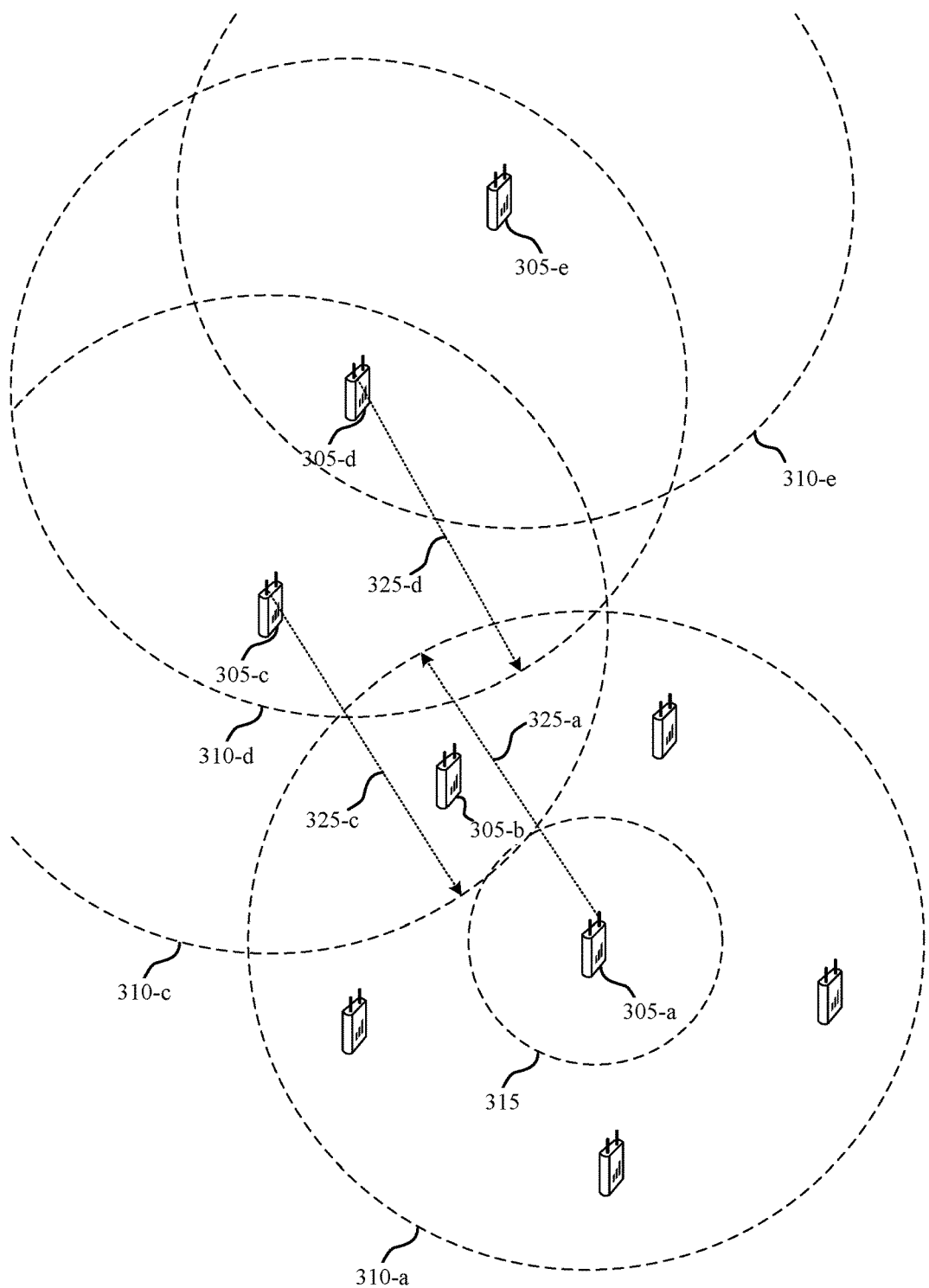
FIG. 3 illustrates an example of a wireless network that supports network architecture for multi-band operation in accordance with aspects of the present disclosure.

FIG. 3 illustrates an example of a wireless network 300 that supports multi-band operation in accordance with various aspects of the present disclosure. In some examples, wireless network 300 may implement aspects of wireless communication system 100. Wireless network 300 includes multiple base stations 305 (e.g., which may be examples of base stations 105 or wireless devices 200). Each base station 305 may be operable to support communications for a plurality of UEs located within a respective low-band coverage area 310. Additionally, each base station 305 may support communications for UEs located within a respective high-band coverage area 315 (with only one high-band coverage area 315 being shown for clarity). Thus, each base station 305 may have multiple radios or otherwise support communication over frequency bands that experience different path loss. As discussed above, high-band coverage areas 315 may generally be smaller than low-band coverage areas 310 (e.g., due to higher path loss in the higher frequency band). Accordingly, while high-band communications in wireless network 300 may experience relatively low degrees of interference from communications of neighboring base stations 305, low-band communications associated with the same base stations 305 may experience unacceptable levels of interference. Accordingly, techniques described herein may provide an architecture for wireless network 300 whereby multi-band operation is facilitated in spite of the relatively low ISDs.

In accordance with the described techniques, wireless network 300 may support multi-band SON functionality. That is, the base stations 305 (e.g., via inter-node communication, or in conjunction with some coordinating network entity) may identify an optimal (e.g., or near-optimal) configuration for supporting multi-band operations. As described further below, an optimal configuration may be determined by some combination of a coverage metric and a band utilization metric (e.g., such that coverage gaps for low-band communications are minimized while low-band interference and path loss are considered to optimize low-band capacity). In some cases, wireless network 300 may dynamically or semi-statically update a configuration pattern (e.g., based on changes in the communication environment such as the introduction of another base station 305). Various techniques for supporting the SON functionality are considered. Aspects of the SON functionality may be supported by DRS transmissions (e.g., or similar transmissions) which may allow a given base station 305 to identify nearby base stations 305 as well as relative (e.g., or absolute) distances between itself and each nearby base station 305.

As an example, base station 305-a may transmit a low-band DRS 325-a that reaches (e.g., with a given minimum signal strength) devices located within low-band coverage area 310-a. Similarly, base station 305-c may transmit a low-band DRS 325-c that reaches devices within a respective low-band coverage area 310-c. However, because of the relative proximity of base stations 305-a and 305-c, intermediate devices (e.g., UEs being served within the high-band coverage area of base station 305-b) may experience unacceptable levels of low-band interference between signals transmitted by base stations 305-a and 305-c. Although some low-band interference may be mitigated through the use of power control (e.g., closed-loop power control) or beamforming, the relatively low path loss at the low-band frequencies may result in utilization of carriers in the low-band frequency region being limited by interference between signals transmitted by base stations 305-a and 305-c. That is, a configuration in which base stations 305-a, 305-c are low-band capable may have a lower low-band utilization metric. Alternatively, a configuration in which base stations 305-a, 305-e are low-band capable while base stations 305-b, 305-c, and 305-d serve UEs 115 using only high-band communications may have coverage gaps that reduce a spatial coverage metric. For example, the coverage area 310-a for base station 305-a at the low-band frequencies and the coverage area 310-e for base station 305-e at the low-band frequencies may not overlap (or may have a low degree of overlap), and may thus leave a region without low-band coverage.

In some examples, multiple configurations of base stations 305 having the low-band communications enabled may be evaluated using respective spatial coverage metrics and band utilization metrics for the low-band communications. For example, an initial or seed base station 305 may be selected, and one or more candidate configurations may be determined by topologically propagating assignment of low-band enabled base stations 305 starting from the seed base station 305. For example, base station 305-*a* may be selected as a seed base station (e.g., randomly) and the signal metric pattern for DRS signals 325 from base station 305-*a* and other neighboring base stations may be evaluated for identifying a next closest low-band enabled base station. Base stations 305 that receive DRS signals 325-*a* having a signal strength above a first threshold may be excluded as candidates for the next closest low-band enabled base station as the level of interference between the base stations would be capacity limiting. Stated differently, the benefit of having higher signal strength is outweighed by the potential interference. Further, if the received DRS signals 325-*a* have a signal strength that is too strong, the respective receiving base stations 305 may be excluded as candidates because the respective base stations would be too close to one another and cause excessive signal interference and bandwidth capacity issues due to at least the excessive signal interference.

For base stations 305 that receive DRS signals 325-*a* below the first threshold, the DRS signals of those base stations may be compared with the DRS signals 325-*a* of base station 305-*a*. For example, base station 305-*c* may receive DRS signals 325-*a* below the first threshold. Thus, the DRS signals 325-*a* and 325-*c* may be evaluated at base stations 305 (e.g., including base station 305-*b*) that can receive DRS signals 325-*a* and 325-*c*. Based on DRS signals 325-*a* and 325-*c* received at the evaluating base stations 305, it may be determined that signals transmitted by base station 305-*a* and 305-*c* via the same carrier would interfere with one another in a capacity limiting manner (e.g., the benefit of having higher signal strength is outweighed by the potential interference). Thus, 305-*c* may also be excluded from being the next closest low-band enabled base station. Various parameters such as the first threshold and interference may be different for different network configurations and may be set by network operators according to the specific circumstances of the system. For example, the first threshold may be based on varying parameters, which in turn, may depend on at least the different configurations of various mobile devices and networks.

As this process is repeated for additional base stations 305 (e.g., proceeding downward in order of received signal strength of DRS signals 325-*a*), base station 305-*d* may also be evaluated according to DRS signals 325-*a* and 325-*d* received at intermediate base stations (e.g., including base stations 305-*b* and 305-*c*). In this case, it may be determined that signals from base stations 305-*a* and 305-*d* do not excessively interfere in the low band (e.g., the interference may not outweigh the benefits of higher signal power from the candidate base station). Thus, base station 305-*d* may be selected as the next closest low-band enabled base station for the candidate configuration. Additional next closest low-band enabled base stations to base station 305-*a* may be identified in a similar manner, taking into account the other already selected low-band enabled base stations. In this way, the signal metric pattern (which may include the received signal strength measured by base stations 305 of each received DRS signal 325 from other base stations) may be used to determine proximity of low-band enabled base stations.

A similar process may then be repeated for base station 305-*d* to select the next closest low-band enabled base stations to base station 305-*d* for the candidate configuration, until the configuration has propagated topologically to determine the low-band enabled base stations for the service area. Multiple candidate configurations may be determined by starting with different seed base stations (e.g., starting with base station 305-*b* instead of 305-*a*). In some examples, the seed base stations and next nearest low-band enabled base stations may be selected by other means. For example, the next nearest low-band enabled base stations may be selected based on received signal strength of DRS signals at the neighboring base stations (e.g., without comparing DRS signal strength at intermediate base stations).

Once the candidate configurations are identified, multiple configurations may be evaluated according to their respective spatial coverage metrics and low-band utilization metrics. In some cases, the spatial coverage metrics are given priority in evaluating the candidate configurations. For example, any candidate configurations that do not meet a spatial coverage criteria may be eliminated, and then the candidate configuration having the highest low-band utilization metric may be selected. In other cases, candidate configurations having the same or similar (e.g., within a threshold) spatial coverage metrics may be evaluated against each other according to their respective low-band utilization metrics to select the final configuration.

Once the configuration of low-band enabled base stations 305 are selected, the other base stations 305 may have their low-band radios disabled for serving UEs (e.g., the low-band radios may still be used for synchronization or further multi-band SON communications). The base stations 305 having their low-band radios disabled may then be grouped or assigned to anchor low-band enabled base stations 305 of the configuration according to the received signal strength of the low-band enabled base station DRS signals (e.g., a high-band only base station 305 may be grouped to the low-band enabled base station associated with the highest low-band DRS received signal strength, or by backhaul type or latency). Where the network includes base stations 305 that are not low-band capable base stations (e.g., do not have a low-band radio or transmitter), these base stations may be assumed to not have the low-band enabled for determining candidate configurations. In addition, any base station with only low-band capability can be assumed to be low-band enabled. It should be understood that the configuration of low-band enabled base stations does not affect the coverage or interference of the high-band communications, because all base stations 305 having high-band capability will be enabled for high-band communications.

In the illustrated example, a configuration may be identified in which base stations 305-*a*, 305-*d* operate over the low-band to provide low-band communications for respective low-band coverage areas 310-*a*, 310-*d*, and each base station (e.g., including base stations 305-*a*, 305-*d*) operates over the high-band (e.g., and thus has a corresponding high-band coverage area 315).

In some cases, an optimal configuration may change based on introduction of one or more additional base stations 305. For example, the additional base stations 305 may alter a given spatial coverage metric or band utilization metric. Accordingly, upon detection of a new base station 305 in a given communication area, the configuration may be updated (e.g., semi-statically). The updated configuration may be determined using analogous techniques to those described above or may be determined based on modular alterations to the existing configuration. In some cases, the size of a given coverage area may be modified (e.g., based on some configurable transmission power).

In some cases, the signal metric pattern may be updated based on received signal strength information measured by UEs within the service area. For example, reported signal strength of DRS signals from UEs with known locations within the service area may be added to the signal metric pattern, and the candidate configuration determination and evaluation process may use the UE-data enhanced signal metric pattern. In some cases, UE reported low-band coverage gaps (e.g., radio link failures, etc.) may also be used to evaluate a current configuration against candidate configurations (e.g., by updating the calculated spatial coverage metrics with empirical data). Additionally, as stated previously, in some examples, the signal metric pattern may be based on a spatial coverage metric, a first band utilization metric associated with the first band, or a combination thereof. Additionally, the signal metric pattern may be determined by the received signal strengths of discovery reference signals or signals from a base station, user equipment (UE), or both.

Figure 4:
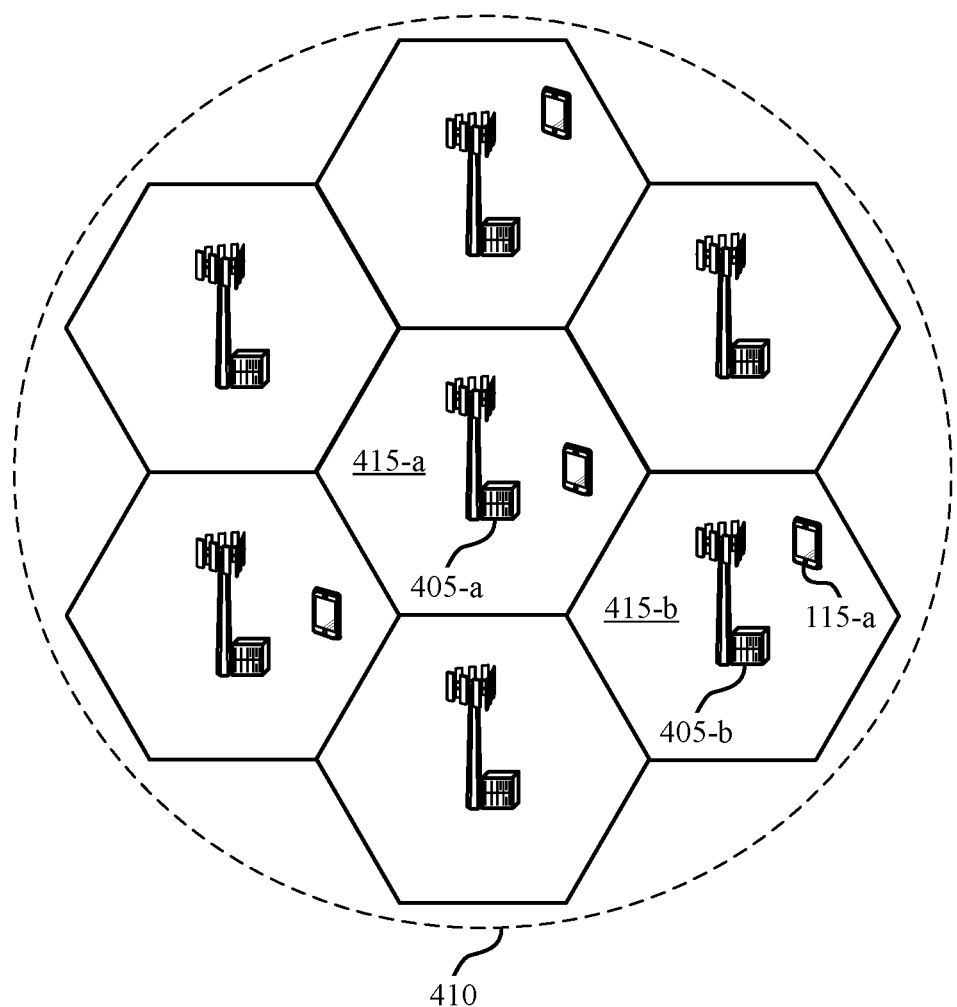
FIG. 4 illustrates an example of a network configuration that supports network architecture for multi-band operation in accordance with aspects of the present disclosure.

FIG. 4 illustrates an example of a network configuration 400 that supports network architecture for multi-band operation in accordance with various aspects of the present disclosure. In some examples, network configuration 400 may implement aspects of wireless communication system 100. Network configuration 400 may be based on SON functionality as described with reference to FIG. 3. For example, base station 405-a (e.g., which may be an example of any of the corresponding devices above) may be an example of an anchor device that provides low-band communications for a low-band coverage area 410. Each base station 405 within low-band coverage area 410 may be a serving base station for a cell that provides coverage for a respective high-band coverage area 415.

As described above, coverage constraints on the high-band communications (e.g., relative to the low-band communications) results in a topology with multiple high-band base stations 405 (e.g., base stations 405 in which communications over a low-band radio are suspended) in the low-band coverage area 410 of an anchor base station (e.g., base station 405-a). It is to be understood that network configuration 400 is included for the sake of illustration, such that the deployment of the base stations 405 may not fit a regular pattern (e.g., which may in some cases result in coverage gaps in high-band coverage areas 415).

In accordance with the described techniques, the base stations 405 may utilize their respective low-band radios to achieve over-the-air (OTA) synchronization (e.g., based on DRS transmissions from base station 405-a). By way of example, base station 405-b may be an example of a high-band base station 405 (e.g., a multi-band-capable base station operable to support communications over a high-band within coverage area 415-b). Base station 405-b may transmit downlink data to UE 115-a over the high-band, while base station 405-a may communicate with UE 115-a over the low-band. For example, base station 405-a may communicate control information (e.g., ACK/NACK, downlink control information, etc.) with UE 115-a over the low-band.

Figure 5:
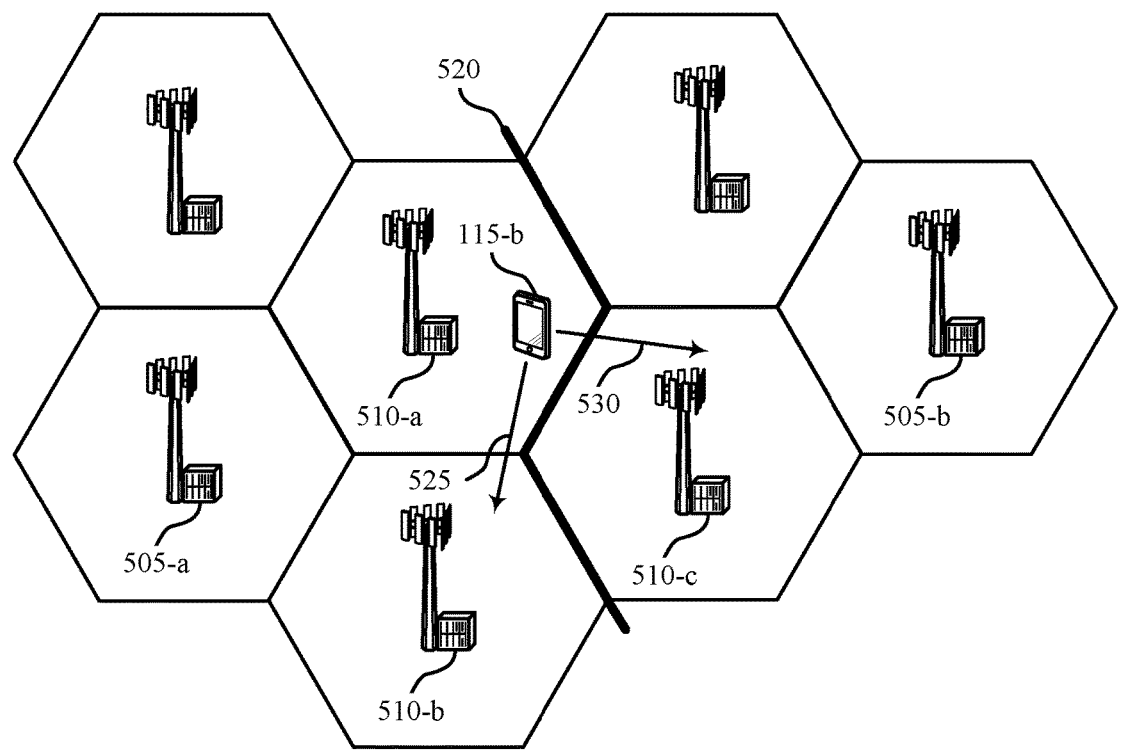
FIG. 5 illustrates an example of a network configuration that supports network architecture for multi-band operation in accordance with aspects of the present disclosure.

FIG. 5 illustrates an example of a network configuration 500 that supports multi-band operation in accordance with various aspects of the present disclosure. In some examples, network configuration 500 may implement aspects of wireless communication system 100. Network configuration 500 includes a plurality of base stations 505 providing coverage for UEs 115 (e.g., UE 115-b).

Base stations 505-a, 505-b may be example of devices supporting simultaneous communication over low-band and high-band radios. Each base station 505 may have one or more associated base stations 510 located within its respective low-band coverage area. Base stations 510 may provide high-band communication support to UEs 115 within a respective high-band coverage area. For example, some base stations 510 may be capable of communication in both low and high bands but not be enabled to support communication for UEs (serve UEs via a low-band cell) in a current network configuration, while other base stations 510 may be only high-band capable. In aspects of the present disclosure, the base stations 510 associated with a given anchor base station 505 (e.g., base stations 510-a, 510-b for base station 505-a) may be associated with a common RRC configuration. The common RRC configuration may allow relatively seamless mobility within the high-band (e.g., and/or may limit the overhead associated with RRC reconfiguration). The RRC configurations may be provisioned by the low-band base station (e.g., base station 505-a). Such a common RRC configuration may be useful in use cases such as AR/VR (e.g., in which frequent switching between base stations 510-a, 510-b may occur due to communication obstacles). In some examples, high-band base stations 510 may be grouped into multiple groups, each group having a common RRC configuration.

In some cases, a UE 115 (e.g., UE 115-b) may operate in an energy-efficient mode (e.g., in periods of low data throughput). That is, UE 115-b may in some cases power down (e.g., or off) a high-band radio as described above with reference to FIG. 2. UE 115-b may then activate the high-band radio based on one or more communication conditions. For example, UE 115-b may monitor for high-band DRS transmissions based on signaling received over its low-band radio (e.g., which may indicate a location of UE 115-b or the existence of neighboring high-band cells). In some cases of mmW, the DRS signals may be SMTC signals. Because UE 115-b may in some cases be configured with a set of candidate cells (e.g., during RRC setup or during some subsequent semi-static signaling period), it may determine that it is in the vicinity of a high-band cell associated with a peripheral base station (e.g., base station 510-a) and search for the DRS of the high-band cell based at least in part on a DRS measurement timing configuration (DMTC) window for the low-band. That is, UE 115-b may derive coarse high-band timing based at least in part on signaling received over its low-band radio such that it may in some cases efficiently re-associate with a new cell (e.g., a cell associated with base station 510-b). For example, UE 115-b may indicate a cell identifier associated with the new cell 510-b, and may indicate beam selection information associated with the high-band communication link with the new cell 510-b. In some cases, UE 115-b indicates or transmits the cell selection information (e.g., cell identifier and/or beam information) over its low-band radio to a central base station such as base station 505-a, which may then activate base station 510-b to communicate with UE 115-b. The cell selection information may be indicated via lower layer (e.g., layer-1 or layer-2) signaling such as uplink control information. Such techniques may reduce overhead and/or latency associated with cell search procedures in which additional signaling between base station 105 and UE 115 is employed.

Various backhaul configurations between associated base stations 505, 510 are considered. For example, multiple base stations 510 that are located within the same room or otherwise capable of line-of-sight communications may support wireless backhaul links. Backhaul for NLOS environments between base stations 510 may be provided through the use of wired backhaul links (e.g., Ethernet). Backhaul for distant base stations 510 (e.g., base stations 510 located remotely enough from each other or from anchor base station 505) may be provided through an Internet Service Provider (ISP) network (e.g., a cable-modem). In some cases, non-ideal backhaul may push mobility/roaming architecture towards upper layers. However, ideal backhaul (e.g., provided by the wireless or wired backhaul links described above) may enable lower-layer mobility across base stations 510.

In accordance with the described techniques, a full RRC reconfiguration may occur only when a UE 115 transitions between low-band coverage areas of parent base stations 505-a, 505-b (e.g., indicated by boundary line 520). By way of example, UE 115-b may be located within a low-band coverage area of base station 505-a and also may be located within a high-band coverage area of base station 510-a. Base station 505-a may support low-band communications for UE 115-b while base station 510-a may support high-band communications. In some examples, a high-band cell of base station 510-a is configured as a secondary cell (SCell) for UE 115-b, while in other examples, UE 115-b has a separate connection (e.g., dual-connectivity) with the high-band cell of base station 510-a.

In a first illustrative example, UE 115-b may move along path 525 such that it is located within a high-band coverage area of base station 510-b at some subsequent point in time. In accordance with the described techniques, base stations 510-a, 510-b may have a common RRC configuration (e.g., with some optional base station-specific parameters). For example, the common RRC configuration may be provided by base station 505-a. Accordingly, a full RRC reconfiguration may not be necessary for UE 115-b when it enters the high-band coverage area of base station 510-b (e.g., because base stations 510-a, 510-b share a common RRC configuration or have relatively minor RRC configuration differences that do not require a full RRC reconfiguration). In aspects of the present disclosure, the switch between base stations 510-a, 510-b may be UE-controlled or transparent to base station 505-a. For example, while in the low-band coverage area of base station 505-a, the decision to switch between base stations 510 may be driven by UE 115-b. In some cases, the switch may involve signaling (e.g., beam selection) to support high-band communications. In dual-connectivity configurations, UE 115-b may be handed off between base stations 510-a, 510-b for high-band communications using mobility signaling (e.g., forward handover, reverse handover).

In some cases, UE 115-b may be capable of supporting only one high-band communication link at a time. Thus, multiple high-band cells may be pre-configured for use (e.g., via RRC configuration), while only one high-band cell may be an activated high-band cell for the UE 115-b. For example, when UE 115-b is currently served by a high-band cell of base station 510-a and indicates switching to a new high-band cell of base station 510-b, the anchor base station 505-a may deactivate the high-band cell of base station 510-a for UE 115-b and activate the high-band cell of base station 510-b. Because the high-band cell of base station 510-b is preconfigured for use, the switching may be performed without additional signaling from the base station to indicate activation of the new high-band cell. In addition, pre-configuration of multiple high-band cells may be different from carrier aggregation in that carrier aggregation generally requires monitoring of all configured SCells for radio resource management. However, for a UE without the capability of monitoring multiple concurrent high-band links, carrier aggregation may not be suitable. Instead, pre-configuration of multiple high-band cells with UE-controlled cell switching provides the UE flexibility in how it measures and switches between high-band cells. For example, the UE may only monitor DRS signals of other high-band cells when conditions are below a certain level for a currently active high-band cell. Alternatively, measurement gaps (e.g., corresponding to a DMTC window) may be provided to allow the UE to measure neighboring high-band cells. However, because switching is UE-controlled, the UE may not have to perform reporting for non-active high-band cells, and thus may adaptively determine when to monitor DRS signals of neighboring high-band cells.

In a second illustrative example, UE 115-c may move along path 530 such that it crosses boundary line 520 and enters the low-band coverage area of base station 505-b. In such a scenario, UE 115-b may undergo a handoff procedure (e.g., a full RRC reconfiguration) from base station 505-a to base station 505-b. The handoff procedure may include provisioning the UE 115-b with a new set of high-band base stations 510 (e.g., including base station 510-c, which may replace base station 510-a as a high-band serving base station for UE 115-b).

Figure 6:
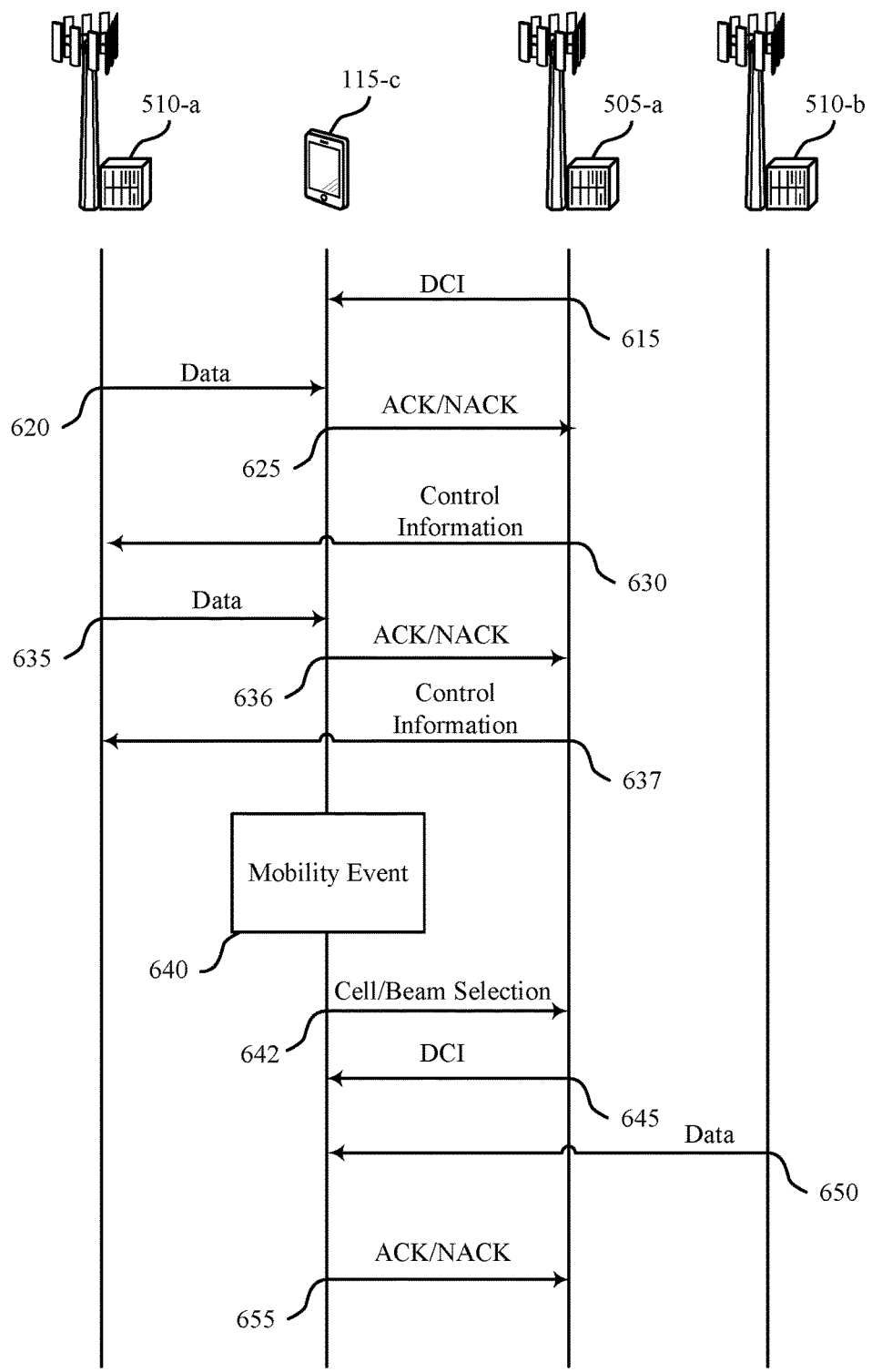
FIG. 6 illustrates an example of a process flow that supports network architecture for multi-band operation in accordance with aspects of the present disclosure.

FIG. 6 illustrates an example of a process flow 600 that supports network architecture for multi-band operation in accordance with various aspects of the present disclosure. In some examples, process flow 600 may implement aspects of wireless communication system 100. Process flow 600 includes UE 115-c, which may be an example of the UEs described above. Process flow 600 also includes high-band base stations 510-a, 510-b, which may be examples of base stations supporting communication over a high-band while suspending communications over a low-band radio. Process flow 600 also includes low-band base station 505-a, which may be an example of a base station that supports communications over low-band radio(s) and high-band radio(s) (e.g., simultaneously). One or both of the low-band communications and high-band communications may utilize shared frequency spectrum. For example, the low-band communication links may operate using licensed spectrum while the high-band communications use unlicensed or shared spectrum subject to LBT constraints. Alternatively, the low-band communication links may also use unlicensed or shared spectrum subject to LBT. The process flow 600 may apply to low-band communications using licensed, unlicensed, or shared spectrum.

High-band base stations 510-a, 510-b may support high-band communications within the low-band coverage area of low-band base station 505-a. For example, the configuration of the base stations as low-band or high-band may be based on a signal metric pattern as described with reference to FIG. 3. In the present example, UE 115-c may initially be located within the high-band coverage area of high-band base station 510-a. UE 115-c may be capable of only supporting one concurrent high-band communication link. Thus, UE 115-c may be configured (e.g., by low-band base station 505-a) with RRC configurations of high-band cells from base stations 510-a and 510-b (which may be a common configuration), but may autonomously select one of the high-band cells to be activated for the UE 115-c. Initially, the high-band cell of base station 510-a may be activated for the UE 115-c.

At 615, low-band base station 505-a may transmit downlink control information (DCI) to UE 115-c. For example, the DCI may include transmission power control (TPC), resource scheduling, etc. The DCI may be transmitted over the low-band (e.g., using the low-band radios of low-band base station 505-a). By way of example, the DCI may indicate the presence of a high-band data transmission from high-band base station 510-a. Accordingly, based on the DCI, UE 115-c may activate a high-band radio (e.g., which may be inactivated in periods of low high-band activity to conserve energy).

At 620, high-band base station 510-a may transmit the downlink data transmission to UE 115-c over the high band. At 625, UE 115-c may transmit uplink control information (e.g., ACK/NACK) to low-band base station 505-a based on the downlink data transmission. Whether the UE 115-c transmits the ACK/NACK information to low-band base station 505-a via the low-band communication link, or to high-band base station 510-a via the high-band communication link may depend on whether the UE 115-c can close the uplink. The ability of the UE 115-c to close the uplink refers to a determination at the UE 115-c that it can support the uplink without violating one or more constraints. The determination may in some cases depend on power constraints of UE 115-c, a distance between the communicating devices, a utilization metric of the channel carrying the high-band communication link, etc. UE 115-c may indicate (e.g., in an uplink control transmission, an RRS, or some other signaling via the low-band communication link) an ability to close the uplink of the high-band communication link (not shown). If the UE 115-a signals an ability to close the uplink for high-band communication link, the high-band base station 510-a (e.g., or some other suitable network entity) may schedule uplink resources for UE 115-c over the high-band communication link.

By way of example, UE 115-c may not be able to successfully decode the data transmission at 620 (e.g., due to some signal interference or attenuation), such that the uplink control information comprises a NACK.

At 630, low-band base station 505-a may transmit control information associated with the downlink transmission to high-band base station 510-a. For example, the indication may be transmitted over a backhaul link (e.g., which may be wired or wireless).

At 635, high-band base station 510-a may retransmit the data transmission based at least in part on the NACK. In some cases, the retransmission may be self-scheduled by high-band base station 510-a upon receiving the NACK information from low-band base station 505-a. In other cases, the retransmission may be scheduled based on control information transmitted over the low-band by low-band base station 505-a. UE 115-c may transmit uplink control information 636 to low-band base station 505-a based on the retransmission, which may be relayed in control information communication 637 to high-band base station 510-a.

At 640, UE 115-c may undergo a mobility event. As an example, the mobility event may be analogous to that depicted by path 525 with respect to FIG. 5. The UE 115-c may detect the mobility event based on measurements of high-band DRS signals for high-band cells of base stations 510-a and 510-b. Accordingly, UE 115-c may move from the high-band coverage area of high-band base station 510-a to the high-band coverage area of high-band base station 510-b (e.g., but may remain within the low-band coverage area of low-band base station 505-a). Accordingly, a full RRC reconfiguration may not be necessary (e.g., because high-band base stations 510-a and 510-b share a common RRC configuration with some optional base station-specific parameters which may be associated with a limited reconfiguration).

At 642, UE 115-c may transmit cell selection information to base station 505-a indicating the switch from high-band base station 510-a to high-band base station 510-b. The signaling may be, for example, lower layer signaling such as layer-1 or layer-2 signaling (e.g., uplink control information, etc.). The lower layer signaling may use resources (e.g., PUCCH resources) allocated for unprompted transmission (e.g., scheduling request resources or the like) from UE 115-c.

At 645, low-band base station 505-a may transmit DCI to UE 115-c (e.g., indicating the presence of a high-band data transmission from high-band base station 510-b). At 650, high-band base station 510-b may transmit the data to UE 115-c over the high-band. At 655, UE 115-c may transmit uplink control information over the low-band to low-band base station 505-a (e.g., where the uplink control information is based at least in part on the data transmission at 650).

Figure 7:
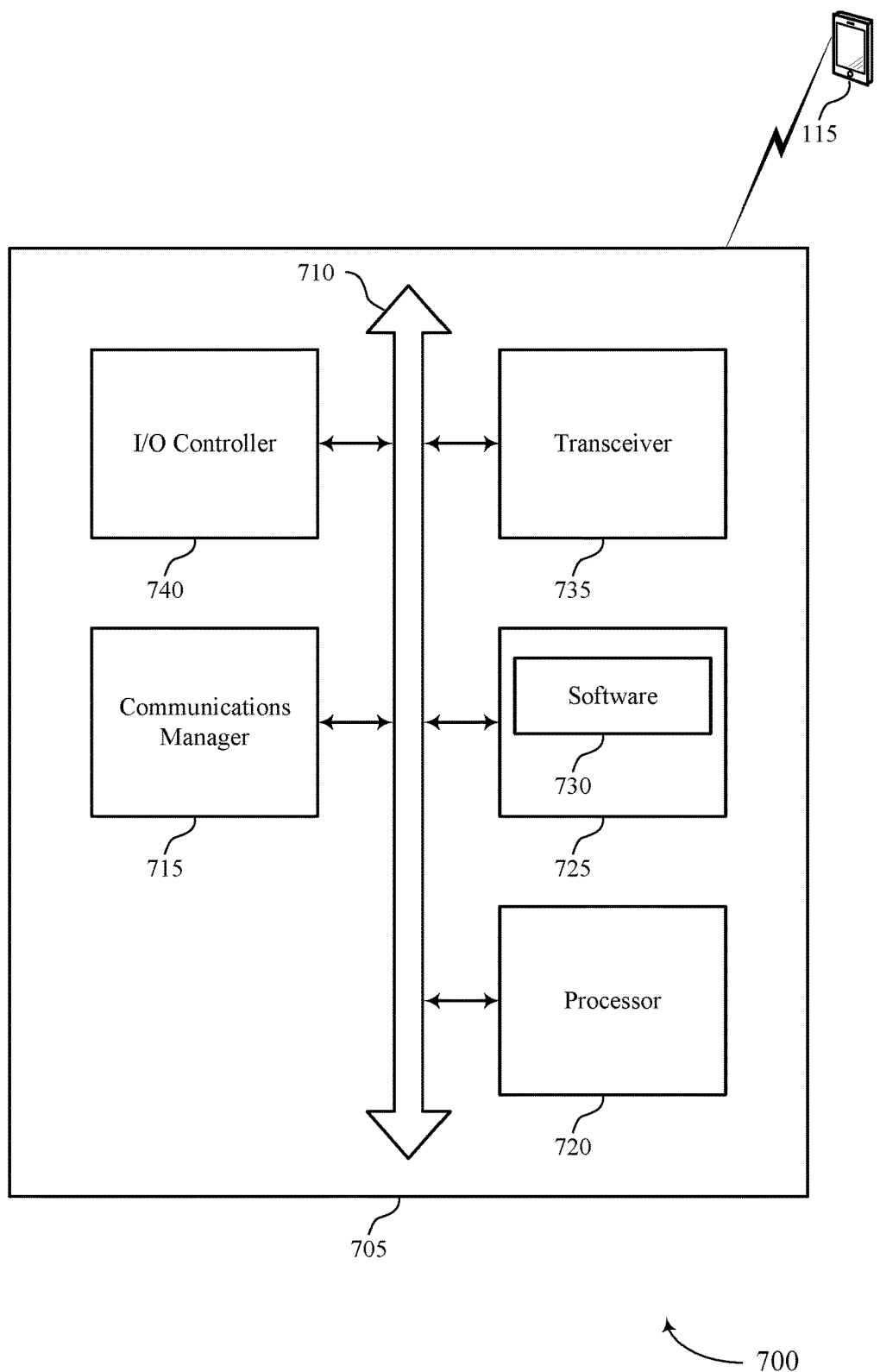
FIG. 7 illustrates a block diagram of a system including a network entity that supports network architecture for multi-band operation in accordance with aspects of the present disclosure.

FIG. 7 shows a diagram of a system 700 including a device 705 that supports network architecture for multi-band operation in accordance with aspects of the present disclosure. Device 705 may include components for bi-directional voice and data communications including components for transmitting and receiving communications, including communications manager 715, processor 720, memory 725, software 730, transceiver 735, and I/O controller 740. These components may be in electronic communication via one or more buses (e.g., bus 710).

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting network architecture for multi-band operation).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support network architecture for multi-band operation. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

I/O controller 740 may manage input and output signals for device 705. I/O controller 740 may also manage peripherals not integrated into device 705. In some cases, I/O controller 740 may represent a physical connection or port to an external peripheral. In some cases, I/O controller 740 may utilize an operating system such as iOS®, ANDROID®, MS-DOS®, MS-WINDOWS®, OS/2®, UNIX®, LINUX®, or another known operating system. In other cases, I/O controller 740 may represent or interact with a modem, a keyboard, a mouse, a touchscreen, or a similar device. In some cases, I/O controller 740 may be implemented as part of a processor. In some cases, a user may interact with device 705 via I/O controller 740 or via hardware components controlled by I/O controller 740.

Figure 8:
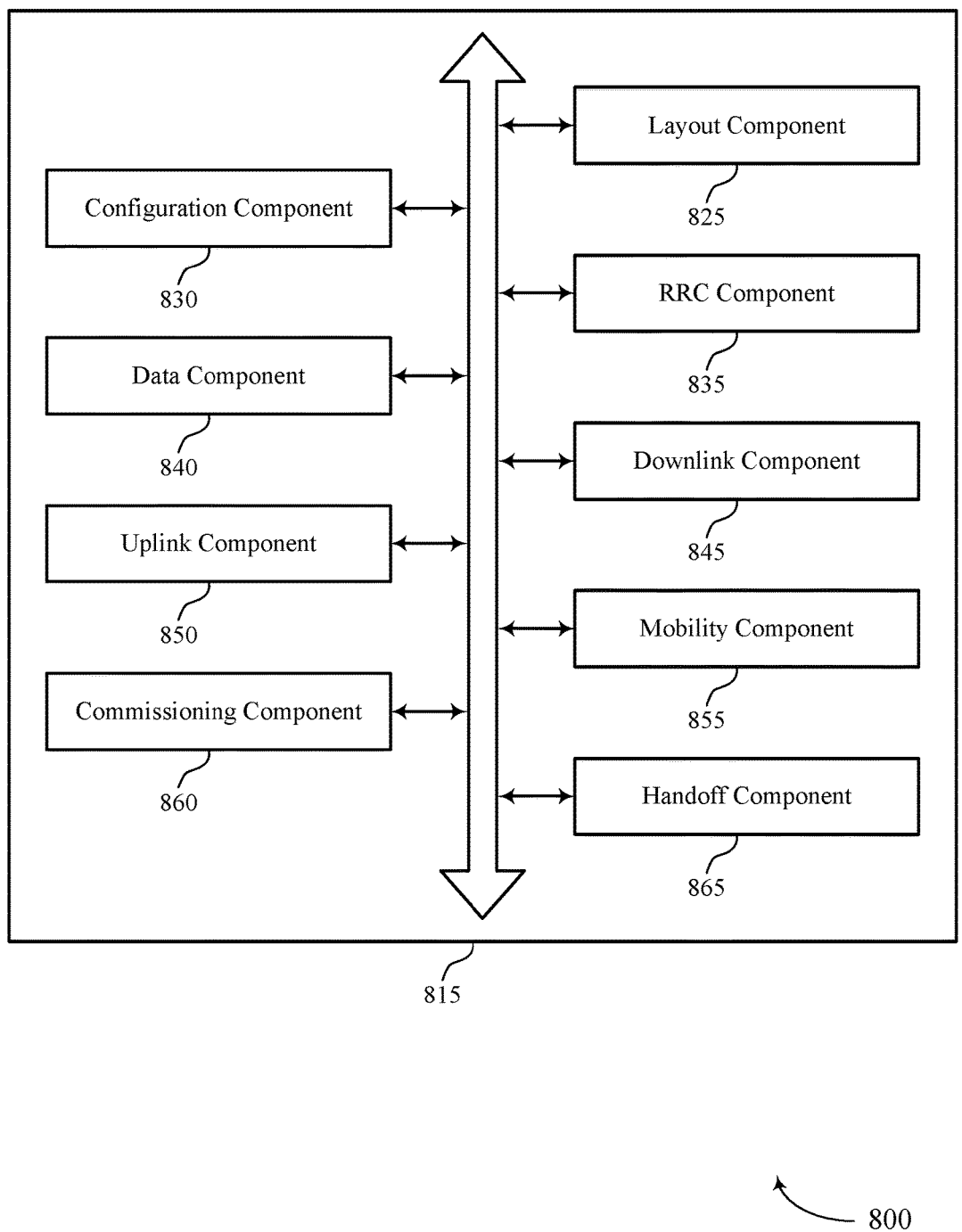
FIG. 8 illustrates a wireless communications manager that supports network architecture for multi-band operation in accordance with aspects of the present disclosure.

FIG. 8 shows a block diagram 800 of a communications manager 815 that supports network architecture for multi-band operation in accordance with aspects of the present disclosure. The communications manager 815 may be an example of aspects of a communications manager 205 described with reference to FIG. 2. The communications manager 815 may include layout component 825, configuration component 830, RRC component 835, data component 840, downlink component 845, uplink component 850, mobility component 855, commissioning component 860, and handoff component 865. Each of these modules may communicate, directly or indirectly, with one another (e.g., via one or more buses).

Layout component 825 may determine a signal metric pattern for respective signals transmitted by the set of base stations over the first frequency band. The layout component 825 may select a configuration from the one or more configurations based on the first band utilization metrics of the one or more configurations. The layout component 825 may determine, for at least a subset of the set of base stations, signal strength metrics for signals transmitted by other base stations of the set of base stations, where the spatial coverage metric is computed based on the signal strength metrics. The layout component 825 may determine, for a subset of the set of base stations, signal interference metrics associated with interference between signals transmitted by other base stations of the set of base stations, where the first band utilization metric is computed based on the signal interference metrics. The layout component 825 may determine a second signal metric pattern for second respective signals transmitted by the second set of base stations over the first frequency band. In some cases, the signal metric pattern is based on a spatial coverage metric, a first band utilization metric associated with the first band, or a combination thereof. In some cases, determining the signal metric pattern includes determining one or more configurations of the set of base stations for the first group of base stations and the second group of base stations, where the spatial coverage metric for each of the one or more configurations satisfies a spatial coverage requirement.

Configuration component 830 may configure, based on the signal metric pattern, a first group of base stations of the set of base stations to operate over the first frequency band and the second frequency band for the wireless communications service. The configuration component 830 may in some cases configure, based on the signal metric pattern, a second group of base stations of the set of base stations to operate only over the second frequency band for the wireless communications service. The configuration component 830 may associate each base station in the second group of base stations with a respective one of the base stations in the first group of base stations for the wireless communications service. The configuration component 830 may configure, based on the second signal metric pattern, a third group of base stations of the second set of base stations to operate over the first frequency band and the second frequency band for the wireless communications service. The configuration component 830 may configure, based on the second signal metric pattern, a fourth group of base stations of the second set of base stations to operate only over the second frequency band for the wireless communications service. The configuration component 830 may associate each base station in the fourth group of base stations with a respective one of the base stations in the third group of base stations for the wireless communications service.

RRC component 835 may provision a first subset of the second group of base stations with a first common RRC configuration, where the first subset of the second group of base stations is associated with a first base station in the first group of base stations. RRC component 835 may provision a second subset of the second group of base stations with a second common RRC configuration different from the first common RRC configuration, where the second subset of the second group of base stations is associated with a second base station in the first group of base stations, and where the first subset and second subsets of the second group of base stations include disjoint subsets.

Data component 840 may provide the wireless communications service to a first subset of the set of UEs based on the provisioning and provide the wireless communications service to a second subset of the set of UEs based on the provisioning.

Downlink component 845 may transmit, to the UE, second downlink data over the second frequency band from the second base station of the first subset of the second group of base stations. Downlink component 845 may transmit, to the UE, downlink data over the second frequency band from a serving base station of the second subset of the second group of base stations. In some cases, providing the wireless communications service to the first subset of the set of UEs includes transmitting, to at least one UE of the first subset of the set of UEs, downlink data over the second frequency band from a serving base station of the first subset of the second group of base stations.

Uplink component 850 may receive, uplink control information transmitted from the at least one UE over the first frequency band, the uplink control information based on the downlink data. Uplink component 850 may receive second uplink control information transmitted from the UE over the first frequency band, the second uplink control information based on the second downlink data Uplink component 850 may receive uplink control information transmitted from the UE over the first frequency band, the uplink control information based on the downlink data.

Mobility component 855 may detect a mobility event of a UE of the first subset of the set of UEs based on a received signal strength corresponding to a reference signal transmitted on the first frequency band or the second frequency band. Commissioning component 860 may commission a second base station of the first subset of the second group of base stations for the UE based on the detected mobility event. Handoff component 865 may perform a handover from the first base station in the first group of base stations to the second base station in the first group of base stations based on the detected mobility event.

Figure 9:
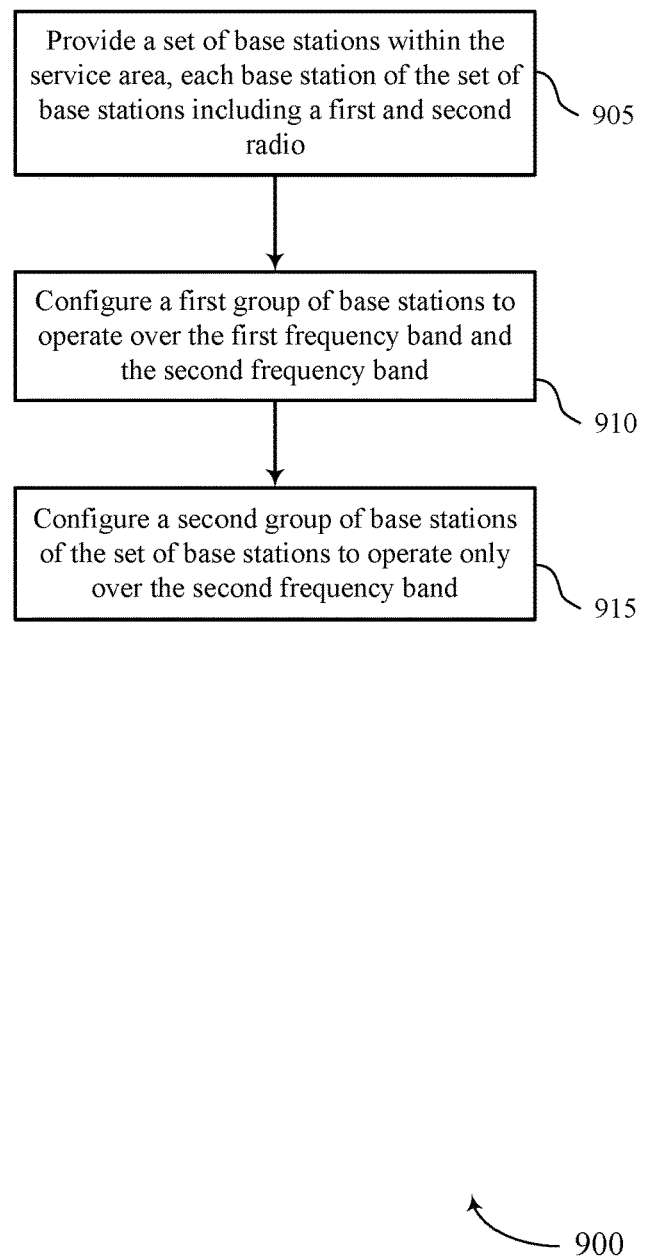
FIGS. 9 and 10 illustrate methods for network architecture for multi-band operation in accordance with aspects of the present disclosure.

FIG. 9 shows a flowchart illustrating a method 900 for network architecture for multi-band operation in accordance with aspects of the present disclosure. The operations of method 900 may be implemented by a network entity or its components as described herein. For example, the operations of method 900 may be performed by a communications manager as described with reference to FIGS. 2 and 8. In some examples, a network entity may execute a set of codes to control the functional elements of the device to perform the functions described below. Additionally or alternatively, the network entity may perform aspects of the functions described below using special-purpose hardware.

At block 905 the network entity may provide a plurality of base stations within the service area, each base station of the plurality of base stations comprising a first radio associated with a first antenna array supporting communication over a first frequency band and a second radio associated with a second antenna array supporting communication over a second frequency band, the first frequency band associated with a first path loss and the second frequency band associated with a second path loss greater than the first path loss.

At block 910 the network entity may configure, based at least in part on the signal metric pattern, a first group of base stations of the plurality of base stations to operate over the first frequency band and the second frequency band for the wireless communications service. An optimization process may begin with each base station of a set of base stations within a service area transmitting pilot or reference signals (e.g., DRS signals, etc.) over channels of the low frequency band, and a signal metric pattern may be determined based on the low-band reference signals. The network (e.g., one or more wireless communication managers in the base stations) may configure, based on the signal metric pattern, a first group of base stations of the set of base stations to operate over the first frequency band and the second frequency band for the wireless communications service.

The network entity may determine a signal metric pattern for respective signals transmitted by the plurality of base stations over the first frequency band. The signal metric pattern may be based on a spatial coverage metric, a first band utilization metric associated with the first band, or a combination thereof. Additionally, the signal metric pattern may be determined by the received signal strengths of discovery reference signals or signals from a base station, user equipment (UE), or both. The operations of block 910 may be performed according to the methods described herein. In certain examples, aspects of the operations of block 910 may be performed by a configuration component as described with reference to FIG. 8.

At block 915 the network entity may configure, based at least in part on the signal metric pattern, a second group of base stations of the plurality of base stations to operate only over the second frequency band for the wireless communications service. Further, the network entity may associate each base station in the second group of base stations with a respective base station in the first group of base stations for the wireless communications service. For example, a base station may be selected as a seed base station (e.g., randomly) and the signal metric pattern for DRS signals from a second base station and other neighboring base stations may be evaluated for identifying a next closest low-band enabled base station. Base stations that receive DRS signals having a signal strength above a first threshold may be excluded as candidates for the next closest low-band enabled base station as the level of interference between the base stations would be capacity limiting. Stated differently, the benefit of having higher signal strength is outweighed by the potential interference. Additionally, if the received DRS signals have a signal strength that is too strong, the respective receiving base stations may be excluded as candidates because the respective base stations would be too close to one another and cause excessive signal interference and capacity issues due to at least the excessive signal interference. The operations of block 915 may be performed according to the methods described herein. In certain examples, aspects of the operations of block 915 may be performed by a configuration component as described with reference to FIG. 8.

Figure 10:
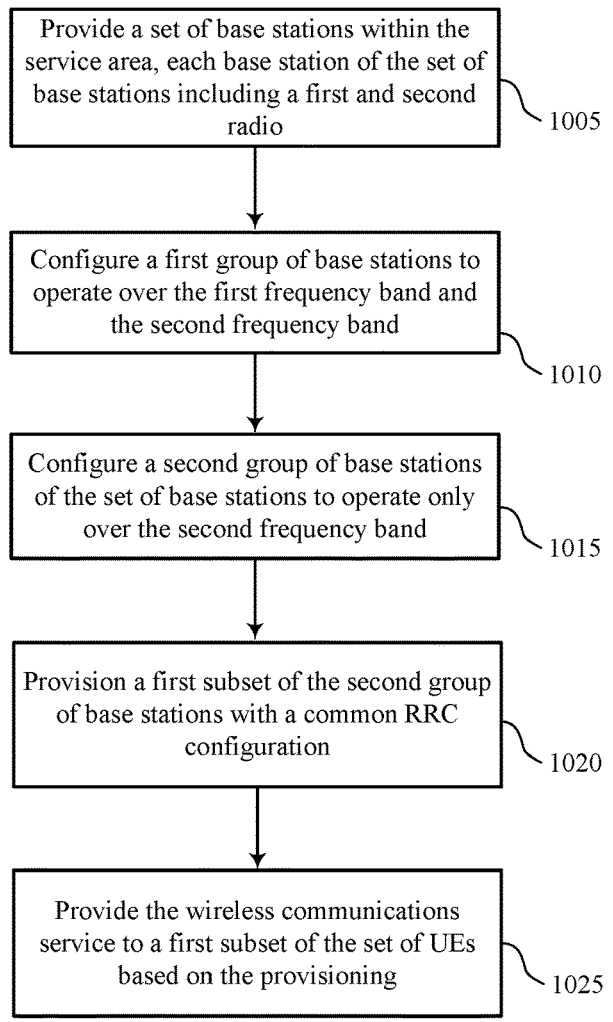

FIG. 10 shows a flowchart illustrating a method 1000 for network architecture for multi-band operation in accordance with aspects of the present disclosure. The operations of method 1000 may be implemented by a network entity or its components as described herein. For example, the operations of method 1000 may be performed by a communications manager as described with reference to FIGS. 2 and 8. In some examples, a network entity may execute a set of codes to control the functional elements of the device to perform the functions described below. Additionally or alternatively, the network entity may perform aspects of the functions described below using special-purpose hardware.

At block 1005 the network entity may provide a plurality of base stations within the service area, each base station of the plurality of base stations comprising a first radio associated with a first antenna array supporting communication over a first frequency band and a second radio associated with a second antenna array supporting communication over a second frequency band, the first frequency band associated with a first path loss and the second frequency band associated with a second path loss greater than the first path loss.

At block 1010 the network entity may configure, based at least in part on the signal metric pattern, a first group of base stations of the plurality of base stations to operate over the first frequency band and the second frequency band for the wireless communications service. An optimization process may begin with each base station of a set of base stations within a service area transmitting pilot or reference signals (e.g., DRS signals, etc.) over channels of the low frequency band, and a signal metric pattern may be determined based on the low-band reference signals. The network (e.g., one or more wireless communication managers in the base stations) may configure, based on the signal metric pattern, a first group of base stations of the set of base stations to operate over the first frequency band and the second frequency band for the wireless communications service.

The network entity may determine a signal metric pattern for respective signals transmitted by the plurality of base stations over the first frequency band. The signal metric pattern may be based on a spatial coverage metric, a first band utilization metric associated with the first band, or a combination thereof. Additionally, the signal metric pattern may be determined by the received signal strengths of discovery reference signals or signals from a base station, user equipment (UE), or both. The operations of block 1010 may be performed according to the methods described herein. In certain examples, aspects of the operations of block 1010 may be performed by a configuration component as described with reference to FIG. 8.

At block 1015 the network entity may configure, based at least in part on the signal metric pattern, a second group of base stations of the plurality of base stations to operate only over the second frequency band for the wireless communications service. Further, each base station in the second group of base stations may be associated with or linked with a respective one of the base stations in the first group of base stations for the wireless communications service. The network entity may associate each base station in the second group of base stations with a respective base station in the first group of base stations for the wireless communications service. For example, a base station may be selected as a seed base station (e.g., randomly) and the signal metric pattern for DRS signals from a second base station and other neighboring base stations may be evaluated for identifying a next closest low-band enabled base station. Base stations that receive DRS signals having a signal strength above a first threshold may be excluded as candidates for the next closest low-band enabled base station as the level of interference between the base stations would be capacity limiting. Stated differently, the benefit of having higher signal strength is outweighed by the potential interference. Additionally, if the received DRS signals have a signal strength that is too strong, the respective receiving base stations may be excluded as candidates because the respective base stations would be too close to one another and cause excessive signal interference and capacity issues due to at least the excessive signal interference. The operations of block 1015 may be performed according to the methods described herein. In certain examples, aspects of the operations of block 1015 may be performed by a configuration component as described with reference to FIG. 8.

At block 1020 the network entity may provision a first subset of the second group of base stations with a first common RRC configuration, wherein the first subset of the second group of base stations is associated with a first base station in the first group of base stations. The common RRC configuration may allow relatively seamless mobility within the high-band (e.g., and/or may limit the overhead associated with RRC reconfiguration). The RRC configurations may be provisioned by a low-band base station. Such a common RRC configuration may be useful in use cases such as AR/VR (e.g., in which frequent switching between base stations may occur due to communication obstacles). In some examples, high-band base stations may be grouped into multiple groups, each group having a common RRC configuration. The operations of block 1020 may be performed according to the methods described herein. In certain examples, aspects of the operations of block 1020 may be performed by a RRC component as described with reference to FIG. 8.

At block 1025 the network entity may provide the wireless communications service to a first subset of the plurality of UEs based at least in part on the provisioning. In an example, a UE may move along a path such that it crosses a boundary line and it may enter the low-band coverage area of a second base station and be leaving the coverage area of a first base station. In such a scenario, the UE may undergo a handoff procedure (e.g., a full RRC reconfiguration) from the first base station to the second base station. The handoff procedure may include provisioning the UE with a new set of high-band base stations (e.g., including the second base station, which may replace the first base station as a high-band serving base station for the UE). The operations of block 1025 may be performed according to the methods described herein. In certain examples, aspects of the operations of block 1025 may be performed by a data component as described with reference to FIG. 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for providing a wireless communications service for a plurality of user equipments (UEs) in a service area, comprising:

providing a plurality of base stations within the service area, each base station of the plurality of base stations comprising a first radio associated with a first antenna array supporting communication over a first frequency band and a second radio associated with a second antenna array supporting communication over a second frequency band, the first frequency band associated with a first path loss and the second frequency band associated with a second path loss greater than the first path loss;

configuring, based at least in part on a signal metric pattern for respective signals transmitted by the plurality of base stations over the first frequency band, a first group of base stations of the plurality of base stations to operate over the first frequency band and the second frequency band for the wireless communications service;

configuring, based at least in part on the signal metric pattern, a second group of base stations of the plurality of base stations to operate only over the second frequency band for the wireless communications service, wherein each base station in the second group of base stations is associated with a respective one of the base stations in the first group of base stations for the wireless communications service.

2. The method of claim 1, wherein the signal metric pattern is based on a spatial coverage metric, a first band utilization metric associated with the first band, or a combination thereof.

3. The method of claim 2, the method further comprising:
selecting a configuration from one or more configurations of the plurality of base stations for the first group of base stations and the second group of base stations, based at least in part on first band utilization metrics of the one or more configurations, wherein a spatial coverage requirement is satisfied for the spatial coverage metric for each of the one or more configurations.

4. The method of claim 2, further comprising:
computing the spatial coverage metric based at least in part on the signal strength metrics, wherein the signal strength metrics for at least a subset of the plurality of base stations is based on signals transmitted by other base stations of the plurality of base stations.

5. The method of claim 2, further comprising:
computing the first band utilization metric based at least in part on the signal interference metrics, wherein the signal interference metrics for a subset of the plurality of base stations is associated with interference between signals transmitted by other base stations of the plurality of base stations.

6. The method of claim 1, further comprising:
providing at least one additional base station within the service area, the at least one additional base station and the plurality of base stations comprising a second plurality of base stations, wherein each of the at least one additional base stations comprises a first radio associated with a first antenna array supporting communication over the first frequency band and a second radio associated with a second antenna array supporting communication over the second frequency band;
configuring, based at least in part on the second signal metric pattern for second respective signals transmitted by the second plurality of base stations over the first frequency band, a third group of base stations of the second plurality of base stations to operate over the first frequency band and the second frequency band for the wireless communications service;
configuring, based at least in part on the second signal metric pattern, a fourth group of base stations of the second plurality of base stations to operate only over the second frequency band for the wireless communications service, wherein each base station in the fourth group of base stations is associated with a respective one of the base stations in the third group of base stations for the wireless communications service.

7. The method of claim 1, further comprising:
provisioning a first subset of the second group of base stations with a first common radio resource control (RRC) configuration, wherein the first subset of the second group of base stations is associated with a first base station in the first group of base stations; and
providing the wireless communications service to a first subset of the plurality of UEs based at least in part on the provisioning.

8. The method of claim 7, wherein providing the wireless communications service to the first subset of the plurality of UEs comprises:
transmitting, to at least one UE of the first subset of the plurality of UEs, downlink data over the second frequency band from a serving base station of the first subset of the second group of base stations; and
the method further comprising receiving, at the first base station in the first group of base stations, uplink control information transmitted from the at least one UE over the first frequency band, the uplink control information based at least in part on the downlink data.

9. The method of claim 8, further comprising:
detecting a mobility event of a UE of the first subset of the plurality of UEs based at least in part on a received signal strength corresponding to a reference signal transmitted on the first frequency band or the second frequency band;
commissioning a second base station of the first subset of the second group of base stations for the UE based at least in part on the detected mobility event;
transmitting, to the UE, second downlink data over the second frequency band from the second base station of the first subset of the second group of base stations; and
receiving, at the first base station in the first group of base stations, second uplink control information transmitted from the UE over the first frequency band, the second uplink control information based at least in part on the second downlink data.

10. The method of claim 7, further comprising:
provisioning a second subset of the second group of base stations with a second common RRC configuration different from the first common RRC configuration, wherein the second subset of the second group of base stations is associated with a second base station in the first group of base stations, and wherein the first subset and second subsets of the second group of base stations comprise disjoint subsets; and
providing the wireless communications service to a second subset of the plurality of UEs based at least in part on the provisioning.

11. The method of claim 10, further comprising:
detecting a mobility event of a UE of the first subset of the plurality of UEs based at least in part on a received signal strength corresponding to a reference signal transmitted on the first frequency band or the second frequency band;
performing a handover from the first base station in the first group of base stations to the second base station in the first group of base stations based at least in part on the detected mobility event;
transmitting, to the UE, downlink data over the second frequency band from a serving base station of the second subset of the second group of base stations; and
receiving, at the second base station in the first group of base stations, uplink control information transmitted from the UE over the first frequency band, the uplink control information based at least in part on the downlink data.

12. An apparatus for wireless communication within a service area, comprising:
means for configuring, based at least in part on the signal metric pattern for respective signals transmitted by a plurality of base stations within the service area over the first frequency band, a first group of base stations of the plurality of base stations to operate over the first frequency band and the second frequency band for the wireless communications service, wherein each base station of the plurality of base stations comprising a first radio associated with a first antenna array supporting communication over a first frequency band and a second radio associated with a second antenna array supporting communication over a second frequency band, the first frequency band associated with a first path loss and the second frequency band associated with a second path loss greater than the first path loss;
means for configuring, based at least in part on the signal metric pattern, a second group of base stations of the plurality of base stations to operate only over the second frequency band for the wireless communications service, wherein each base station in the second group of base stations is associated with a respective one of the base stations in the first group of base stations for the wireless communications service.

13. The apparatus of claim 12, wherein the signal metric pattern is based on a spatial coverage metric, a first band utilization metric associated with the first band, or a combination thereof.

14. The apparatus of claim 13, further comprising:
means for selecting a configuration from the one or more configurations of the plurality of base stations for the first group of base stations and the second group of base stations based at least in part on first band utilization metrics of the one or more configurations, wherein a spatial coverage requirement is satisfied for the spatial coverage metric for each of the one or more configurations.

15. The apparatus of claim 13, further comprising:
means for computing the spatial coverage metric based at least in part on the signal strength metrics, wherein the signal strength metrics for at least a subset of the plurality of base stations is based on signals transmitted by other base stations of the plurality of base stations.

16. The apparatus of claim 13, further comprising:
means for computing the first band utilization metric based at least in part on the signal interference metrics, wherein the signal interference metrics for a subset of the plurality of base stations is associated with interference between signals transmitted by other base stations of the plurality of base stations.

17. The apparatus of claim 12, wherein at least one additional base station comprising a first radio associated with a first antenna array supporting communication over the first frequency band and a second radio associated with a second antenna array supporting communication over the second frequency band is provided within the service area, the at least one additional base station and the plurality of base stations comprising a second plurality of base stations, the apparatus further comprising:
means for configuring, based at least in part on the second signal metric pattern for second respective signals transmitted by the second plurality of base stations over the first frequency band, a third group of base stations of the second plurality of base stations to operate over the first frequency band and the second frequency band for the wireless communications service;
means for configuring, based at least in part on the second signal metric pattern, a fourth group of base stations of the second plurality of base stations to operate only over the second frequency band for the wireless communications service, wherein each base station in the fourth group of base stations is associated with a respective one of the base stations in the third group of base stations for the wireless communications service.

18. The apparatus of claim 12, further comprising:
means for provisioning a first subset of the second group of base stations with a first common radio resource control (RRC) configuration, wherein the first subset of the second group of base stations is associated with a first base station in the first group of base stations; and
means for providing the wireless communications service to a first subset of the plurality of UEs based at least in part on the provisioning.

19. An apparatus for wireless communication within a service area, comprising:
a processor;
memory in electronic communication with the processor; and
instructions stored in the memory and operable, when executed by the processor, to cause the apparatus to:
configure, based at least in part on the signal metric pattern for respective signals transmitted by a plurality of base stations within the service area over the first frequency band, a first group of base stations of the plurality of base stations to operate over the first frequency band and the second frequency band for the wireless communications service, wherein each base station of the plurality of base stations comprising a first radio associated with a first antenna array supporting communication over a first frequency band and a second radio associated with a second antenna array supporting communication over a second frequency band, the first frequency band associated with a first path loss and the second frequency band associated with a second path loss greater than the first path loss;
configure, based at least in part on the signal metric pattern, a second group of base stations of the plurality of base stations to operate only over the second frequency band for the wireless communications service, wherein each base station in the second group of base stations is associated with a respective one of the base stations in the first group of base stations for the wireless communications service.

20. The apparatus of claim 19, wherein the signal metric pattern is based on a spatial coverage metric, a first band utilization metric associated with the first band, or a combination thereof.

21. The apparatus of claim 20, wherein the instructions are further executable by the processor to:
select a configuration from the one or more configurations of the plurality of base stations for the first group of base stations and the second group of base stations based at least in part on the first band utilization metrics of the one or more configurations, wherein a spatial coverage requirement is satisfied for the spatial coverage metric for each of the one or more configurations.

22. The apparatus of claim 20, wherein the instructions are further executable by the processor to:
compute the spatial coverage metric based at least in part on the signal strength metrics, wherein the signal strength metrics for at least a subset of the plurality of base stations is based on signals transmitted by other base stations of the plurality of base stations.

23. The apparatus of claim 20, wherein the instructions are further executable by the processor to:
compute the first band utilization metric based at least in part on the signal interference metrics, wherein the signal interference metrics for a subset of the plurality of base stations is associated with interference between signals transmitted by other base stations of the plurality of base stations.

24. The apparatus of claim 19, wherein the instructions are further executable by the processor to:
determine a second signal metric pattern for second respective signals transmitted by a second plurality of base stations over the first frequency band, wherein the second plurality of base stations comprises at least one additional base station and the plurality of base stations, each of the at least one additional base stations comprises a first radio associated with a first antenna array supporting communication over the first frequency band and a second radio associated with a second antenna array supporting communication over the second frequency band;

configure, based at least in part on the second signal metric pattern for second respective signals transmitted by a second plurality of base stations over the first frequency band, a third group of base stations of the second plurality of base stations to operate over the first frequency band and the second frequency band for the wireless communications service, wherein the second plurality of base stations comprises at least one additional base station and the plurality of base stations, each of the at least one additional base stations comprises a first radio associated with a first antenna array supporting communication over the first frequency band and a second radio associated with a second antenna array supporting communication over the second frequency band;

configure, based at least in part on the second signal metric pattern, a fourth group of base stations of the second plurality of base stations to operate only over the second frequency band for the wireless communications service, wherein each base station in the fourth group of base stations is associated with a respective one of the base stations in the third group of base stations for the wireless communications service.

25. The apparatus of claim 19, wherein the instructions are further executable by the processor to:

provision a first subset of the second group of base stations with a first common radio resource control (RRC) configuration, wherein the first subset of the second group of base stations is associated with a first base station in the first group of base stations; and provide the wireless communications service to a first subset of the plurality of UEs based at least in part on the provisioning.

26. The apparatus of claim 25, wherein the instructions are further executable by the processor to:

transmit, to at least one UE of the first subset of the plurality of UEs, downlink data over the second frequency band from a serving base station of the first subset of the second group of base stations; and receive, at the first base station in the first group of base stations, uplink control information transmitted from the at least one UE over the first frequency band, the uplink control information based at least in part on the downlink data.

27. The apparatus of claim 26, wherein the instructions are further executable by the processor to:

detect a mobility event of a UE of the first subset of the plurality of UEs based at least in part on a received signal strength corresponding to a reference signal transmitted on the first frequency band or the second frequency band;

commission a second base station of the first subset of the second group of base stations for the UE based at least in part on the detected mobility event;

transmit, to the UE, second downlink data over the second frequency band from the second base station of the first subset of the second group of base stations; and receive, at the first base station in the first group of base stations, second uplink control information transmitted from the UE over the first frequency band, the second uplink control information based at least in part on the second downlink data.

28. The apparatus of claim 25, wherein the instructions are further executable by the processor to:

provision a second subset of the second group of base stations with a second common RRC configuration different from the first common RRC configuration, wherein the second subset of the second group of base stations is associated with a second base station in the first group of base stations, and wherein the first subset and second subsets of the second group of base stations comprise disjoint subsets; and provide the wireless communications service to a second subset of the plurality of UEs based at least in part on the provisioning.

29. The apparatus of claim 28, wherein the instructions are further executable by the processor to:

detect a mobility event of a UE of the first subset of the plurality of UEs based at least in part on a received signal strength corresponding to a reference signal transmitted on the first frequency band or the second frequency band;

perform a handover from the first base station in the first group of base stations to the second base station in the first group of base stations based at least in part on the detected mobility event;

transmit, to the UE, downlink data over the second frequency band from a serving base station of the second subset of the second group of base stations; and receive, at the second base station in the first group of base stations, uplink control information transmitted from the UE over the first frequency band, the uplink control information based at least in part on the downlink data.

30. A non-transitory computer readable medium storing code for wireless communication within a service area, the code comprising instructions executable by a processor to:

configure, based at least in part on a signal metric pattern for respective signals transmitted over the first frequency band by a plurality of base stations within the service area, a first group of base stations of the plurality of base stations to operate over the first frequency band and the second frequency band for the wireless communications service, wherein each base station of the plurality of base stations comprising a first radio associated with a first antenna array supporting communication over a first frequency band and a second radio associated with a second antenna array supporting communication over a second frequency band, the first frequency band associated with a first path loss and the second frequency band associated with a second path loss greater than the first path loss;

configure, based at least in part on the signal metric pattern, a second group of base stations of the plurality of base stations to operate only over the second frequency band for the wireless communications service, wherein each base station in the second group of base stations is associated with a respective one of the base stations in the first group of base stations for the wireless communications service.

* * * * *